US012665223B2

(12) United States Patent
Iwasaki et al.

(10) Patent No.: US 12,665,223 B2
(45) Date of Patent: Jun. 23, 2026

(54) NONAQUEOUS ELECTROLYTIC SOLUTION, NONAQUEOUS ELECTROLYTIC SOLUTION BATTERY, AND COMPOUND

(71) Applicant: Central Glass Co., Ltd., Ube (JP)

(72) Inventors: Susumu Iwasaki, Yamaguchi (JP); Miyuki Yamauchi, Yamaguchi (JP); Mikihiro Takahashi, Yamaguchi (JP); Takayoshi Morinaka, Yamaguchi (JP)

(73) Assignee: CENTRAL GLASS CO., LTD., Ube (JP)

( * ) Notice: Subject to any disclaimer, the term of this patent is extended or adjusted under 35 U.S.C. 154(b) by 473 days.

(21) Appl. No.: 18/264,113

(22) PCT Filed: Jan. 28, 2022

(86) PCT No.: PCT/JP2022/003342

§ 371 (c)(1),
(2) Date: Aug. 3, 2023

(87) PCT Pub. No.: WO2022/168755

PCT Pub. Date: Aug. 11, 2022

(65) Prior Publication Data

US 2024/0136578 A1 Apr. 25, 2024

(30) Foreign Application Priority Data

Feb. 4, 2021 (JP) ................................ 2021-016941

(51) Int. Cl.

*H01M 10/00* (2006.01)
*H01M 10/052* (2010.01)
*H01M 10/0567* (2010.01)
*H01M 10/0568* (2010.01)
*H01M 10/0569* (2010.01)

(52) U.S. Cl.

CPC ..... *H01M 10/0567* (2013.01); *H01M 10/052* (2013.01); *H01M 10/0568* (2013.01); *H01M 10/0569* (2013.01); *H01M 2300/0042* (2013.01)

(58) Field of Classification Search

CPC ........... H01M 10/0567; H01M 10/052; H01M 10/0568; H01M 10/0569; H01M 2300/0042

See application file for complete search history.

(56) References Cited

U.S. PATENT DOCUMENTS

| | | | | |
|---|---|---|---|---|
| 2006/0216613 | A1 | 9/2006 | Wang et al. | |
| 2009/0309060 | A1 | 12/2009 | Oka et al. | |
| 2010/0143797 | A1 | 6/2010 | Lee et al. | |
| 2011/0189547 | A1 | 8/2011 | Wang et al. | |
| 2012/0170172 | A1 | 7/2012 | Oka et al. | |
| 2016/0211551 | A1 | 7/2016 | Miyasato et al. | |
| 2020/0251781 | A1 * | 8/2020 | Su | H01M 10/0569 |

FOREIGN PATENT DOCUMENTS

| | | | |
|---|---|---|---|
| CN | 105474452 | 4/2016 | |
| JP | 2004-014248 | 1/2004 | |
| JP | 2009-224281 | 10/2009 | |
| JP | 2010-135330 | 6/2010 | |
| JP | 5109213 B2 | 12/2012 | |
| JP | 2018-172357 | 11/2018 | |
| WO | 2005/027254 | 3/2005 | |
| WO | 2008/001955 | 1/2008 | |
| WO | 2015/030196 | 3/2015 | |
| WO | WO-2019025156 A1 * | 2/2019 | C07D 413/04 |

OTHER PUBLICATIONS

Han et al. "Efficient synthesis of sulfonylguanidines via reaction of tetra-substituted urine with ArSO2NCO" Tetrahedron Letters vol. 60, Issue 48, Nov. 28, 2019, 151285 (Year: 2019).*

International Search Report and Written Opinion of PCT/JP2022/003342, Mar. 1, 2022, 10 pages including English translation of the International Search Report, 10 pages.

Chinese Office Action issued in CN Application 202280013437.1, dated Mar. 17, 2026, 11 pages, English translation provided.

* cited by examiner

*Primary Examiner* — Nicholas P D'Aniello
(74) *Attorney, Agent, or Firm* — HSML P.C.

(57) ABSTRACT

According to a nonaqueous electrolytic solution containing: (I) at least one selected from the group consisting of a compound represented by General Formula (1) described in the specification (for example, a compound represented by the following Formula (1a)) and a compound represented by General Formula (2) (for example, a compound represented by the following Formula (2a)); (II) a solute; and (III) a nonaqueous organic solvent, a nonaqueous electrolytic solution and a nonaqueous electrolytic solution battery having a low initial resistance value, and a compound that can be suitably used in the above nonaqueous electrolytic solution can be provided;

(1a)

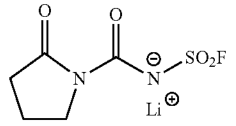

(2a)

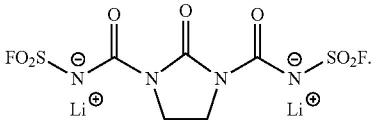

14 Claims, No Drawings

NONAQUEOUS ELECTROLYTIC SOLUTION, NONAQUEOUS ELECTROLYTIC SOLUTION BATTERY, AND COMPOUND

TECHNICAL FIELD

The present disclosure relates to a nonaqueous electrolytic solution, a nonaqueous electrolytic solution battery, and a compound.

BACKGROUND ART

As measures for improving cycle characteristics, high temperature storage characteristics, and durability of a nonaqueous electrolytic solution battery, optimization of various constituting elements of the battery including active materials of a positive electrode and a negative electrode has been hitherto studied. Techniques relating to a nonaqueous electrolytic solution are also no exception, in which it has been proposed to use a variety of additives to prevent deterioration of a nonaqueous electrolyte solution at surfaces of active positive and negative electrodes due to decomposition of the electrolytic solution.

For example, as a nonaqueous electrolytic solution that can constitute a lithium battery with excellent battery characteristics such as cycle characteristics, battery capacity, storage characteristics, and conductivity, Patent Literature 1 discloses a nonaqueous electrolytic solution for a lithium battery, in which an electrolyte is dissolved in a nonaqueous solvent, and the nonaqueous electrolytic solution further contains a pyrrolidone derivative.

Furthermore, Patent Literature 2 describes that a nonaqueous electrolytic solution contains a nitrogen-containing heterocyclic compound such as pyrrolidone, oxazolidinone, or imidazolidinone, so that a nonaqueous electrolytic solution secondary battery with excellent charge and discharge efficiency and capacity retention characteristics over a wide temperature range can be obtained.

CITATION LIST

Patent Literature

Patent Literature 1: JP2009-224281A
Patent Literature 2: JP5109213B

SUMMARY OF INVENTION

Technical Problem

However, as a result of the examination, the present inventors find that when five-membered ring compounds having an amide group are added, an increase in internal resistance is confirmed, and there is no or there is a small effect of improving initial input and output characteristics. Thus, there is room for further investigation of resistance characteristics, particularly of initial resistance characteristics.

The present disclosure is made in view of the above circumstances, and an object thereof is to provide a nonaqueous electrolytic solution and a nonaqueous electrolytic solution battery which can reduce an initial resistance value of a battery. Another object is to provide a compound that can be suitably used in the above nonaqueous electrolytic solution.

Solution to Problem

The present inventors conduct intensive research in view of such a problem and find that a nonaqueous electrolytic solution battery having a low initial resistance value can be obtained by using a nonaqueous electrolytic solution containing: (I) at least one selected from the group consisting of a compound represented by General Formula (1) described later and a compound represented by General Formula (2) described later (hereinafter, also described as "Component (I)"); (II) a solute (hereinafter, also described as "Component (II)"); and (III) a nonaqueous organic solvent (hereinafter, also described as "Component (III)"), thereby solving the above problem.

That is, the present inventors find that the above problem can be solved by the following configurations.

[1]

A nonaqueous electrolytic solution, containing: (I) at least one selected from the group consisting of a compound represented by the following General Formula (1) and a compound represented by the following General Formula (2); (II) a solute; and (III) a nonaqueous organic solvent.

(1)

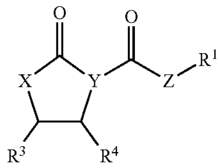

[In General Formula (1), X represents $CH_2$, NH, O, S, or $SO_2$, Y represents CH or N, Z represents $CH_2$, O, or $NR^5$, $R^5$ represents a hydrogen atom, an alkali metal cation, a linear alkyl group having 1 to 12 carbon atoms, or a branched alkyl group having 3 to 12 carbon atoms, an oxygen atom may be included between a carbon atom-carbon atom bond in the alkyl group, any hydrogen atom of the alkyl group may be substituted with a fluorine atom, and when $R^5$ represents an alkali metal cation, a bond between a nitrogen atom and $R^5$ in Z represents an ionic bond, $R^1$ represents $PO(R_f)_2$ or $SO_2R_f$, $R_f$ represents a halogen atom, a linear alkyl group having 1 to 12 carbon atoms, or a branched alkyl group having 3 to 12 carbon atoms, an oxygen atom may be included between a carbon atom-carbon atom bond in the alkyl group, any hydrogen atom of the alkyl group may be substituted with a fluorine atom, and when a plurality of $R_f$'s are present, the plurality of $R_f$'s may be the same or different, and $R^3$ and $R^4$ are independent of each other and each represent a hydrogen atom, a linear alkyl group having 1 to 12 carbon atoms, or a branched alkyl group having 3 to 12 carbon atoms, an oxygen atom may be included between a carbon atom-carbon atom bond in the alkyl group, and any hydrogen atom of the alkyl group may be substituted with a fluorine atom].

(2)

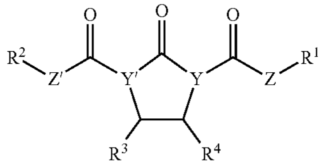

[In General Formula (2), Y and Y' are independent of each other and each represent CH or N, Z and Z' are independent of each other and each represent $CH_2$, O, or $NR^5$, $R^5$ represents a hydrogen atom, an alkali metal cation, a linear alkyl group having 1 to 12 carbon atoms, or a branched alkyl group having 3 to 12 carbon atoms, an oxygen atom may be included between a carbon atom-carbon atom bond in the alkyl group, any hydrogen atom of the alkyl group may be substituted with a fluorine atom, and when $R^5$ represents an alkali metal cation, bonds between nitrogen atoms and $R^5$'s in Z and Z' represent ionic bonds, $R^1$ and $R^2$ are independent of each other and each represent $PO(R_f)_2$ or $SO_2R_f$, $R_f$ represents a halogen atom, a linear alkyl group having 1 to 12 carbon atoms, or a branched alkyl group having 3 to 12 carbon atoms, an oxygen atom may be included between a carbon atom-carbon atom bond in the alkyl group, any hydrogen atom of the alkyl group may be substituted with a fluorine atom, and when a plurality of $R_f$'s are present, the plurality of $R_f$'s may be the same or different, and $R^3$ and $R^4$ are independent of each other and each represent a hydrogen atom, a linear alkyl group having 1 to 12 carbon atoms, or a branched alkyl group having 3 to 12 carbon atoms, an oxygen atom may be included between a carbon atom-carbon atom bond in the alkyl group, and any hydrogen atom of the alkyl group may be substituted with a fluorine atom].

[2]

The nonaqueous electrolytic solution according to [1], in which $R^1$ in General Formula (1) represents $POF_2$ or $SO_2F$.

[3]

The nonaqueous electrolytic solution according to [1] or [2], in which $R^1$ and $R^2$ in General Formula (2) are independent of each other and each represent $POF_2$ or $SO_2F$.

[4]

The nonaqueous electrolytic solution according to any one of [1] to [3], in which Z in General Formula (1) represents $NR^5$, $R^5$ represents a hydrogen atom, a lithium ion, a sodium ion, a linear alkyl group having 1 to 4 carbon atoms, or a branched alkyl group having 3 to 4 carbon atoms.

[5]

The nonaqueous electrolytic solution according to any one of [1] to [4], in which Z and Z' in General Formula (2) are independent of each other and each represent $NR^5$, $R^5$'s are independent of each other and each represent a hydrogen atom, a lithium ion, a sodium ion, a linear alkyl group having 1 to 4 carbon atoms, or a branched alkyl group having 3 to 4 carbon atoms.

[6]

The nonaqueous electrolytic solution according to any one of [1] to [5], in which the solute is at least one selected from the group consisting of $LiPF_6$, $LiBF_4$, $LiSbF_6$, $LiAsF_6$, $LiClO_4$, $LiCF_3SO_3$, $LiC_4F_9SO_3$, $LiN(SO_2F)_2$, $LiAlO_2$, $LiAlCl_4$, LiCl, and LiI, or at least one selected from the group consisting of $NaPF_6$, $NaBF_4$, $NaSbF_6$, $NaAsF_6$, $NaClO_4$, $NaCF_3SO_3$, $NaC_4F_9SO_3$, $NaN(SO_2F)_2$, $NaAlO_2$, $NaAlC_4$, NaCl, and NaI.

[7]

The nonaqueous electrolytic solution according to any one of [1] to [6], in which the nonaqueous organic solvent is at least one selected from the group consisting of a cyclic ester, a chain ester, a cyclic ether, a chain ether, a sulfone compound, a sulfoxide compound, and an ionic liquid.

[8]

The nonaqueous electrolytic solution according to [7], in which the nonaqueous organic solvent contains a cyclic ester, and the cyclic ester is a cyclic carbonate.

[9]

The nonaqueous electrolytic solution according to [8], in which the cyclic carbonate is at least one selected from the group consisting of ethylene carbonate, propylene carbonate, and fluoroethylene carbonate.

[10]

The nonaqueous electrolytic solution according to [7], in which the nonaqueous organic solvent contains a chain ester, and the chain ester is a chain carbonate.

[11]

The nonaqueous electrolytic solution according to [10], in which the chain carbonate is at least one selected from the group consisting of ethyl methyl carbonate, dimethyl carbonate, diethyl carbonate, and methyl propyl carbonate.

[12]

The nonaqueous electrolytic solution according to any one of [1] to [11], in which a content of the (1) is 0.01% by mass to 10.0% by mass with respect to a total amount of the (I), the (II), and the (III).

[13]

The nonaqueous electrolytic solution according to any one of [1] to [12], further containing: at least one selected from the group consisting of vinylene carbonate, bis(oxalato)borate salt, difluorooxalatoborate salt, difluorobis(oxalato)phosphate salt, tetrafluorooxalatophosphate salt, (difluorophosphoryl)(fluorosulfonyl)imide salt, difluorophosphate salt, fluorosulfonate salt, 1,3-propenesultone, 1,3-propanesultone, 1,6-diisocyanatohexane, ethynylethylene carbonate, 1,3,2-dioxathiolane-2,2-dioxide, 4-propyl-1,3,2-dioxathiolane-2,2-dioxide, methylene methanedisulfonate, 1,2-ethanedisulfonic anhydride, methanesulfonyl fluoride, tris(trimethylsilyl)borate, (ethoxy)pentafluorocyclotriphosphazene, lithium tetrafluoro(malonato) phosphate, tetrafluoro(picolinato)phosphate, 1,3-dimethyl-1,3-divinyl-1,3-di(1,1,1,3,3,3-hexafluoroisopropyl) disiloxane, t-butylbenzene, t-amylbenzene, fluorobenzene, and cyclohexylbenzene.

[14]

A nonaqueous electrolytic solution battery, at least including: a positive electrode; a negative electrode; a separator, and the nonaqueous electrolytic solution according to any one of [1] to [13].

[15]

A compound represented by the following General Formula (1) or the following General Formula (2).

(1)

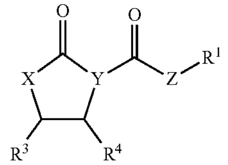

[In General Formula (1), X represents $CH_2$, NH, O, S, or $SO_2$, Y represents CH or N, Z represents $CH_2$, O, or $NR^5$, $R^5$ represents a hydrogen atom, an alkali metal cation, a linear alkyl group having 1 to 12 carbon atoms, or a branched alkyl group having 3 to 12 carbon atoms, an oxygen atom may be included between a carbon atom-carbon atom bond in the alkyl group, any hydrogen atom of the alkyl group may be substituted with a fluorine atom, and when $R^5$ represents an alkali metal cation, a bond between a nitrogen atom and $R^5$ in Z represents an ionic bond, $R^1$ represents $POF_2$ or $SO_2F$, and $R^3$ and $R^4$ are independent of each other and each represent a hydrogen atom, a linear alkyl group having 1 to 12 carbon atoms, or a branched alkyl group having 3 to 12 carbon atoms, an oxygen atom may be included between a carbon atom-carbon atom bond in the alkyl group, and any hydrogen atom of the alkyl group may be substituted with a fluorine atom].

(2)

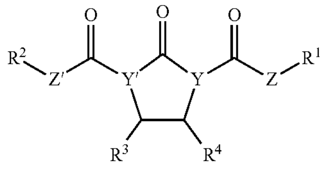

[In General Formula (2), Y and Y' are independent of each other and each represent CH or N, Z and Z' are independent of each other and each represent $CH_2$, O, or $NR^5$, $R^5$ represents a hydrogen atom, an alkali metal cation, a linear alkyl group having 1 to 12 carbon atoms, or a branched alkyl group having 3 to 12 carbon atoms, an oxygen atom may be included between a carbon atom-carbon atom bond in the alkyl group, any hydrogen atom of the alkyl group may be substituted with a fluorine atom, and when $R^5$ represents an alkali metal cation, bonds between nitrogen atoms and $R^5$'s in Z and Z' represent ionic bonds, $R^1$ and $R^2$ are independent of each other and each represent $POF_2$ or $SO_2F$, and $R^3$ and $R^4$ are independent of each other and each represent a hydrogen atom, a linear alkyl group having 1 to 12 carbon atoms, or a branched alkyl group having 3 to 12 carbon atoms, an oxygen atom may be included between a carbon atom-carbon atom bond in the alkyl group, and any hydrogen atom of the alkyl group may be substituted with a fluorine atom].

Advantageous Effects of Invention

According to the present disclosure, a nonaqueous electrolytic solution and a nonaqueous electrolytic solution battery which can reduce an initial resistance value can be provided. A compound that can be suitably used in the above nonaqueous electrolytic solution can be provided.

DESCRIPTION OF EMBODIMENTS

Configurations and combinations thereof in the following embodiments are merely examples, and configuration additions, replacements, and other changes are possible without departing from the scope of the present disclosure. In addition, the present disclosure is not limited by the embodiments, but only by the scope of claims.

Ranges expressed with "to" in the present specification mean ranges including numerical values indicated before and after "to" as a lower limit value and an upper limit value.

An initial resistance value in the present specification represents a resistance value of a nonaqueous electrolytic solution battery immediately after an initial charge and discharge operation for battery stabilization. Specifically, the initial resistance value refers to a resistance value obtained by initial impedance measurement after three cycles of a charge and discharge operation for battery stabilization.

1. Nonaqueous Electrolytic Solution

A nonaqueous electrolytic solution according to the present disclosure, containing: (I) at least one selected from the group consisting of a compound represented by the above General Formula (1) and a compound represented by the above General Formula (2); (II) a solute; and (III) a nonaqueous organic solvent.

Regarding Component (I)

The nonaqueous electrolytic solution according to the present disclosure contains at least one selected from the group consisting of a compound represented by General Formula (1) and a compound represented by General Formula (2) which represent as Component (I).

When the nonaqueous electrolytic solution containing the above Component (I) is used in a nonaqueous electrolytic solution battery (for example, a lithium ion secondary battery or a sodium ion secondary battery), Component (I) decomposes on at least one of a positive electrode and a negative electrode, and forms a film having good cation conductivity on a surface of at least one of the positive electrode and the negative electrode. It is considered that this film prevents direct contact between the nonaqueous organic solvent or solute and an electrode active material, and reduces cation dissociation energy of the solute. As a result, the present inventors presume that an effect of reducing an initial resistance of the nonaqueous electrolytic solution battery is achieved.

The compound represented by General Formula (1) is described below.

(1)

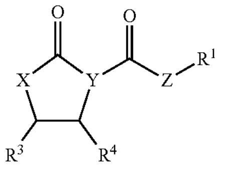

X represents $CH_2$, NH, O, S or $SO_2$. Y represents CH or N. Z represents $CH_2$, O, or $NR_5$.

X is preferably $CH_2$ or O.

Y is preferably N.

Z is preferably $NR^5$.

$R^5$ represents a hydrogen atom, an alkali metal cation, a linear alkyl group having 1 to 12 carbon atoms, or a branched alkyl group having 3 to 12 carbon atoms, an oxygen atom may be included between a carbon atom-carbon atom bond in the alkyl group. Any hydrogen atom of the alkyl group may be substituted with a fluorine atom. When $R^5$ represents an alkali metal cation, a bond between a nitrogen atom and $R^5$ in Z represents an ionic bond.

$R^5$ is preferably a hydrogen atom, an alkali metal cation, a linear alkyl group having 1 to 4 carbon atoms, or a branched alkyl group having 3 to 4 carbon atoms, is more preferably a hydrogen atom, a lithium ion, a sodium ion, a linear alkyl group having 1 to 4 carbon atoms, or a branched alkyl group having 3 to 4 carbon atoms, and further preferably a hydrogen atom, a lithium ion, a sodium ion, or a methyl group.

$R^1$ represents $PO(R_f)_2$ or $SO_2R_f$.

$R_f$ represents a halogen atom, a linear alkyl group having 1 to 12 carbon atoms, or a branched alkyl group having 3 to 12 carbon atoms. When a plurality of $R_f$'s are present, the plurality of $R_f$'s may be the same or different.

Specific examples of $R_f$ representing a linear alkyl group having 1 to 12 carbon atoms or a branched alkyl group having 3 to 12 carbon atoms include a methyl group, an ethyl group, an n-propyl group, an isopropyl group, an n-butyl group, a sec-butyl group, an isobutyl group, a tert-butyl group, and an n-pentyl group.

An oxygen atom may be included between a carbon atom-carbon atom bond in the alkyl group. Specific examples of the above alkyl group containing an oxygen atom between a carbon atom-carbon atom bond include a 2-methoxyethyl group and a 2-ethoxyethyl group.

Any hydrogen atom of the above alkyl group may be substituted with a fluorine atom. Examples of the alkyl group in which any hydrogen atom is substituted with a fluorine atom include a trifluoromethyl group, a difluoromethyl group, a fluoromethyl group, a 2,2,2-trifluoroethyl group, a 2,2-difluoroethyl group, a 2-fluoroethyl group, a 3-fluoropropyl group, a 3,3,3-trifluoropropyl group, a 2,2,3,3,3-pentafluoropropyl group, a 2,2,3,3-tetrafluoropropyl group, and a hexafluoroisopropyl group.

$R^1$ is preferably $POF_2$ or $SO_2F$, and more preferably $SO_2F$.

$R^3$ and $R^4$ are independent of each other and each represent a hydrogen atom, a linear alkyl group having 1 to 12 carbon atoms, or a branched alkyl group having 3 to 12 carbon atoms.

Examples of $R^3$ and $R^4$ representing a hydrogen atom, a linear alkyl group having 1 to 12 carbon atoms, or a branched alkyl group having 3 to 12 carbon atoms include a methyl group, an ethyl group, an n-propyl group, an isopropyl group, an n-butyl group, a sec-butyl group, an isobutyl group, a tert-butyl group, and n-pentyl group.

An oxygen atom may be included between a carbon atom-carbon atom bond in the alkyl group. Specific examples of the above alkyl group containing an oxygen atom between a carbon atom-carbon atom bond include a 2-methoxyethyl group and a 2-ethoxyethyl group.

Any hydrogen atom of the above alkyl group may be substituted with a fluorine atom. Examples of the alkyl group in which any hydrogen atom is substituted with a fluorine atom include a trifluoromethyl group, a difluoromethyl group, a fluoromethyl group, a 2,2,2-trifluoroethyl group, a 2,2-difluoroethyl group, a 2-fluoroethyl group, a 3-fluoropropyl group, a 3,3,3-trifluoropropyl group, a 2,2,3,3,3-pentafluoropropyl group, a 2,2,3,3-tetrafluoropropyl group, and a hexafluoroisopropyl group.

The above alkyl group is preferably an alkyl group having 6 or less carbon atoms because such an alkyl group can reduce resistance when a film is formed on an electrode. The above alkyl group is more preferably an alkyl group having 4 or less carbon atoms, and particularly preferably a methyl group, an ethyl group, an n-propyl group, an isopropyl group, an n-butyl group, or a tert-butyl group.

$R^3$ and $R^4$ are independent of each other and are preferably a hydrogen atom or an alkyl group having 1 to 4 carbon atoms, more preferably a hydrogen atom or a methyl group, particularly preferably a hydrogen atom.

Specifically, the compound represented by General Formula (1) is preferably at least one selected from the group consisting of compounds represented by the following Formulas (1a) to (1r).

The compound represented by General Formula (1) is more preferably at least one selected from the group consisting of the compound represented by Formula (1a) (also referred to as Compound (1a)), the compound represented by Formula (1b) (also referred to as Compound (1b)), the compound represented by Formula (1c) (also referred to as Compound (1c)), the compound represented by Formula (1e) (also referred to as Compound (1e)), and the compound represented by Formula (1f) (also referred to as Compound (1f)), further preferably at least one selected from the group consisting of Compound (1a) and Compound (1e), and particularly preferably Compound (1a).

(1a)

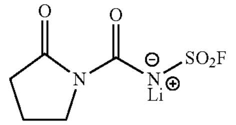

(1b)

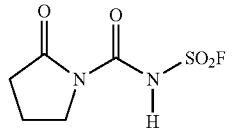

(1c)

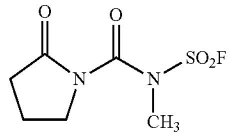

(1d)

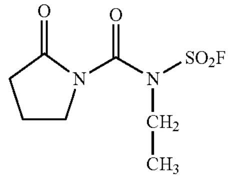

(1e)

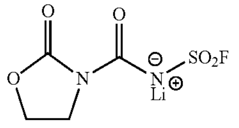

(1f)

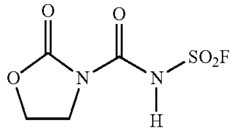

(1g)

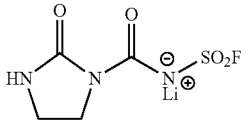

(1h)

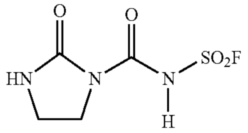

-continued (1i)

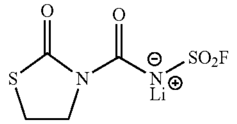

(1j)

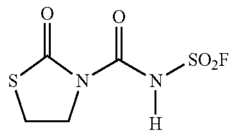

(1k)

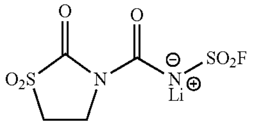

(1l)

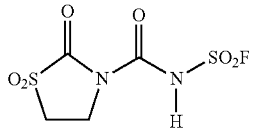

(1m)

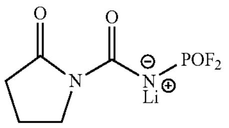

(1n)

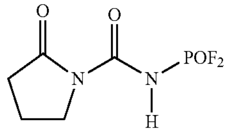

(1o)

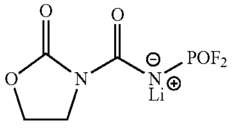

(1p)

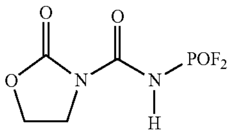

(1q)

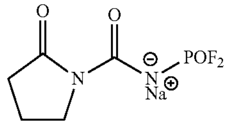

(1r)

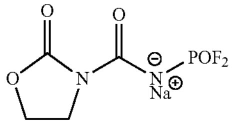

The compound represented by General Formula (2) is described below.

(2)

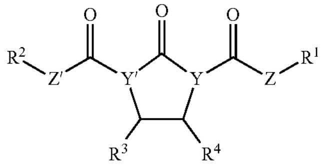

Y and Y' are independent of each other and each represent CH or N. Z and Z' are independent of each other and each represent $CH_2$, O, or $NR^5$.

Both Y and Y' are preferably N.

Both Z and Z' are preferably $NR^5$.

$R^5$ represents a hydrogen atom, an alkali metal cation, a linear alkyl group having 1 to 12 carbon atoms, or a branched alkyl group having 3 to 12 carbon atoms, an oxygen atom may be included between a carbon atom-carbon atom bond in the alkyl group. Any hydrogen atom of the alkyl group may be substituted with a fluorine atom. When $R^5$ represents an alkali metal cation, a bond between a nitrogen atom and $R^5$ in Z and Z' represents an ionic bond.

$R^5$ is preferably a hydrogen atom, an alkali metal cation, a linear alkyl group having 1 to 4 carbon atoms, or a branched alkyl group having 3 to 4 carbon atoms, is more preferably a hydrogen atom, a lithium ion, a sodium ion, a linear alkyl group having 1 to 4 carbon atoms, or a branched alkyl group having 3 to 4 carbon atoms, and further preferably a hydrogen atom, a lithium ion, a sodium ion, or a methyl group.

$R^1$ and $R^2$ are independent of each other and each represent $PO(R_f)_2$ or $SO_2R_f$.

$R_f$ represents a halogen atom, a linear alkyl group having 1 to 12 carbon atoms, or a branched alkyl group having 3 to 12 carbon atoms. When a plurality of $R_f$'s are present, the plurality of $R_f$'s may be the same or different.

Specific examples of $R_f$ representing a linear alkyl group having 1 to 12 carbon atoms or a branched alkyl group having 3 to 12 carbon atoms include a methyl group, an ethyl group, an n-propyl group, an isopropyl group, an n-butyl group, a sec-butyl group, an isobutyl group, a tert-butyl group, and an n-pentyl group.

An oxygen atom may be included between a carbon atom-carbon atom bond in the alkyl group. Specific examples of the above alkyl group containing an oxygen atom between a carbon atom-carbon atom bond include a 2-methoxyethyl group and a 2-ethoxyethyl group.

Any hydrogen atom of the above alkyl group may be substituted with a fluorine atom. Examples of the alkyl group in which any hydrogen atom is substituted with a fluorine atom include a trifluoromethyl group, a difluoromethyl group, a fluoromethyl group, a 2,2,2-trifluoroethyl group, a 2,2-difluoroethyl group, a 2-fluoroethyl group, a 3-fluoropropyl group, a 3,3,3-trifluoropropyl group, a 2,2,3,3,3-pentafluoropropyl group, a 2,2,3,3-tetrafluoropropyl group, and a hexafluoroisopropyl group.

$R^1$ and $R^2$ are independent of each other and preferably $POF_2$ or $SO_2F$, and both $R^1$ and $R^2$ are more preferably $SO_2F$.

$R^3$ and $R^4$ are independent of each other and each represent a hydrogen atom, a linear alkyl group having 1 to 12 carbon atoms, or a branched alkyl group having 3 to 12 carbon atoms.

Examples of $R^3$ and $R^4$ representing a hydrogen atom, a linear alkyl group having 1 to 12 carbon atoms, or a branched alkyl group having 3 to 12 carbon atoms include a methyl group, an ethyl group, an n-propyl group, an isopropyl group, an n-butyl group, a sec-butyl group, an isobutyl group, a tert-butyl group, and an n-pentyl group.

An oxygen atom may be included between a carbon atom-carbon atom bond in the alkyl group. Specific examples of the above alkyl group containing an oxygen atom between a carbon atom-carbon atom bond include a 2-methoxyethyl group and a 2-ethoxyethyl group.

Any hydrogen atom of the above alkyl group may be substituted with a fluorine atom. Examples of the alkyl group in which any hydrogen atom is substituted with a fluorine atom include a trifluoromethyl group, a difluoromethyl group, a fluoromethyl group, a 2,2,2-trifluoroethyl group, a 2,2-difluoroethyl group, a 2-fluoroethyl group, a 3-fluoropropyl group, a 3,3,3-trifluoropropyl group, a 2,2,3,3,3-pentafluoropropyl group, a 2,2,3,3-tetrafluoropropyl group, and a hexafluoroisopropyl group.

The above alkyl group is preferably an alkyl group having 6 or less carbon atoms because such an alkyl group can reduce resistance when a film is formed on an electrode. The above alkyl group is more preferably an alkyl group having 4 or less carbon atoms, and particularly preferably a methyl group, an ethyl group, an n-propyl group, an isopropyl group, an n-butyl group, or a tert-butyl group.

$R^3$ and $R^4$ are independent of each other and are preferably a hydrogen atom or an alkyl group having 1 to 4 carbon atoms, more preferably a hydrogen atom or a methyl group, particularly preferably a hydrogen atom.

Specifically, the compound represented by General Formula (2) is preferably at least one selected from the group consisting of compounds represented by the following Formulas (2a) to (2r).

The compound represented by General Formula (2) is more preferably at least one selected from the group consisting of the compound represented by Formula (2a) (also referred to as Compound (2a)), the compound represented by Formula (2d) (also referred to as Compound (2d)), the compound represented by Formula (2f) (also referred to as Compound (2f)), the compound represented by Formula (2h) (also referred to as Compound (2h)), the compound represented by Formula (2l) (also referred to as Compound (2l)), and the compound represented by Formula (2p) (also referred to as Compound (2p)), further preferably at least one selected from the group consisting of Compound (2a) and Compound (2d), and particularly preferably Compound (2a).

(2a)

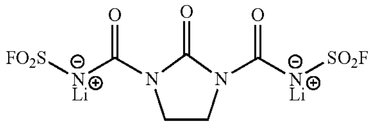

(2b)

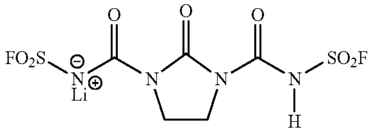

(2c)

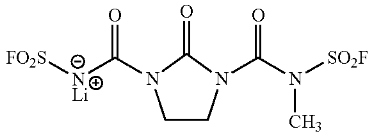

-continued (2d)

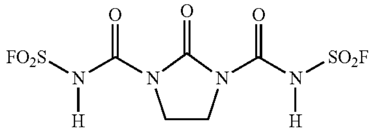

(2e)

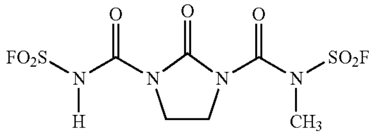

(2f)

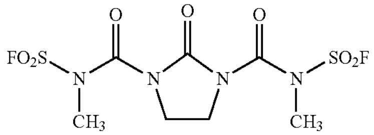

(2g)

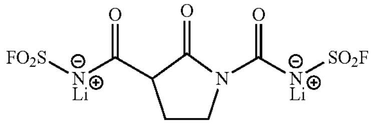

(2h)

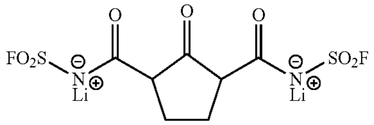

(2i)

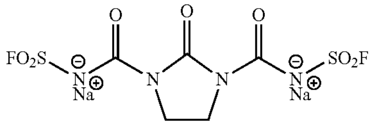

(2j)

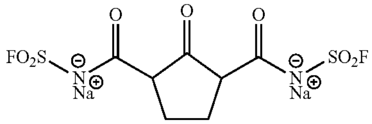

(2k)

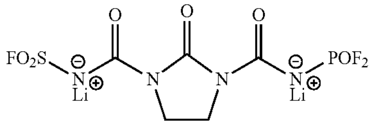

(2l)

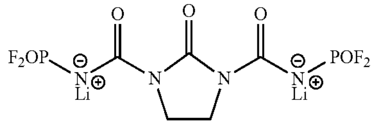

(2m)

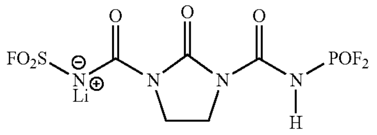

(2n)

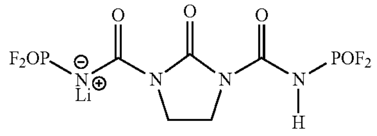

-continued (2o)

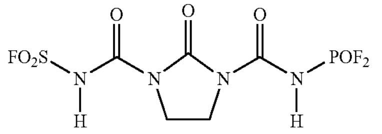

(2p)

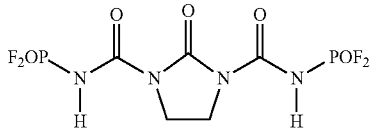

(2q)

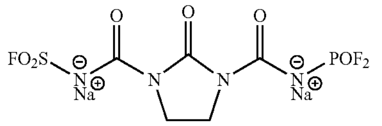

(2r)

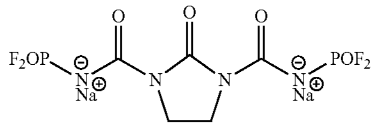

In the nonaqueous electrolytic solution according to the present disclosure, a lower limit of a total amount of the above Component (I) (hereafter, also described as "concentration of (I)") with respect to a total amount (100% by mass) of the above Component (I), the above Component (II), and the above Component (III) is preferably 0.01% by mass or more, more preferably 0.05% by mass or more, and further preferably 0.1% by mass or more. An upper limit of the concentration of (I) is preferably 10 0% by mass or less, more preferably 5.0% by mass or less, and further preferably 2.0% by mass or less.

By setting the concentration of (I) to 0.01% by mass or more, an effect of preventing an increase in the initial resistance of the nonaqueous electrolytic solution battery using the nonaqueous electrolytic solution is easily obtained. On the other hand, by setting the concentration of (I) to 10.0% by mass or less, an increase in viscosity of the nonaqueous electrolytic solution can be prevented, and the effect of preventing an increase in the initial resistance of the nonaqueous electrolytic solution battery using the nonaqueous electrolytic solution is easily obtained.

In the nonaqueous electrolytic solution according to the present disclosure, as Component (I), one type of compound may be used alone, or two or more types of compounds may be mixed and used in any combination and ratio according to an application.

The compound represented by General Formula (1) can be produced by various methods. The production method is not particularly limited.

For example, the compound represented by General Formula (1) can be obtained by causing 2-pyrrolidone or 2-oxazolidone to react with fluorosulfonyl isocyanate or difluorophosphoryl isocyanate, followed by reaction with lithium hydride or dialkyl sulfate.

The compound represented by General Formula (2) can be produced by various methods The production method is not particularly limited.

For example, the compound represented by General Formula (2) can be obtained by causing 2-imidazolidinone to react with fluorosulfonyl isocyanate or difluorophosphoryl isocyanate, followed by reaction with lithium hydride or dialkyl sulfate.

The present disclosure relates to a compound in which $R^1$ represents $POF_2$ or $SO_2F$ in the above General Formula (1), or a compound in which $R^1$ and $R^2$ are independent of each other and each represent $POF_2$ or $SO_2F$ in the above General Formula (2).

The above compound is suitably used as an additive in a nonaqueous electrolytic solution.

(II) Regarding Solute

The nonaqueous electrolytic solution according to the present disclosure contains the solute.

Although the solute is not particularly limited, it is preferably an ionic salt, more preferably an ionic salt containing fluorine.

The solute is preferably, for example, an ionic salt containing a pair of at least one cation selected from the group consisting of alkali metal ions such as lithium ions and sodium ions, alkaline earth metal ions, and quaternary ammonium ions, and at least one anion selected from the group consisting of a hexafluorophosphate anion, a tetrafluoroborate anion, a perchlorate anion, a hexafluoroarsenate anion, a hexafluoroantimonate anion, a trifluoromethanesulfonate anion, a bis(trifluoromethanesulfonyl)imide anion, a bis(pentafluoroethanesulfonyl)imide anion, a (trifluoromethanesulfonyl)(pentafluoroethanesulfonyl)imide anion, a bis(fluorosulfonyl)imide anion, a (trifluoromethanesulfonyl)(fluorosulfonyl)imide anion, a (pentafluoroethanesulfonyl)(fluorosulfonyl)imide anion, and a tris(trifluoromethanesulfonyl)methide anion.

The solute is preferably at least one selected from the group consisting of $LiPF_6$, $LiBF_4$, $LiSbF_6$, $LiAsF_6$, $LiClO_4$, $LiCF_3SO_3$, $LiC_4F_9SO_3$, $LiN(SO_2F)_2$, $LiAlO_2$, $LiAlC_4$, LiCl, and LiI, or at least one selected from the group consisting of $NaPF_6$, $NaBF_4$, $NaSbF_6$, $NaAsF_6$, $NaClO_4$, $NaCF_3SO_3$, $NaC_4F_9SO_3$, $NaN(SO_2F)_2$, $NaAlO_2$, $NaAlC_4$, NaCl, and NaI.

One type of these solutes may be used alone, or two or more types may be mixed and used in any combination and any ratio according to an application.

Among the above solutes, considering energy density, output characteristics, life, and the like of a nonaqueous electrolytic solution battery, the cation is preferably at least one selected from the group consisting of lithium, sodium, potassium, magnesium, and quaternary ammonium, and the anion is preferably at least one selected from the group consisting of a hexafluorophosphate anion, a tetrafluoroborate anion, a bis(trifluoromethanesulfonyl)imide anion, and a bis(fluorosulfonyl)imide anion.

A total amount of the solute in the nonaqueous electrolytic solution according to the present disclosure (hereinafter, also described as "solute concentration") is not particularly limited, but a lower limit is preferably 0.5 mol/L or more, more preferably 0.7 mol/L or more, and still more preferably 0.9 mol/L or more. In addition, an upper limit of the solute concentration is preferably 5.0 mol/L or less, more preferably 4.0 mol/L or less, and still more preferably 2.0 mol/L or less. By setting the solute concentration to 0.5 mol/L or more, it is possible to prevent deterioration of the cycle characteristics and the output characteristics of the nonaqueous electrolytic solution battery due to deterioration in ionic conductivity, and by setting the solute concentration to 5.0 mol/L or less, it is possible to prevent the deterioration in ionic conductivity, cycle characteristics, and output characteristics of the nonaqueous electrolytic solution battery due to an increase in the viscosity of the nonaqueous electrolytic solution.

(III) Regarding Nonaqueous Organic Solvent

A type of the nonaqueous organic solvent used in the nonaqueous electrolytic solution according to the present disclosure is not particularly limited, and any nonaqueous organic solvent can be used.

The nonaqueous organic solvent is preferably at least one selected from the group consisting of a cyclic carbonate, a chain carbonate, a cyclic ester, a chain ester, a cyclic ether, a chain ether, a sulfone compound, a sulfoxide compound, and an ionic liquid.

Specifically, the nonaqueous organic solvent is preferably at least one selected from the group consisting of ethyl methyl carbonate (hereinafter, also described as "EMC"), dimethyl carbonate (hereinafter, also described as "DMC"), diethyl carbonate (hereinafter, also described as "DEC"), methyl propyl carbonate, ethyl propyl carbonate, methyl butyl carbonate, 2,2,2-trifluoroethyl methyl carbonate, 2,2,2-trifluoroethyl ethyl carbonate, 2,2,2-trifluoroethyl propyl carbonate, bis(2,2,2-trifluoroethyl) carbonate, 1,1,1,3,3,3-hexafluoro-1-propylmethyl carbonate, 1,1, 1,3,3,3-hexafluoro-1-propylethyl carbonate, 1, 1, 1,3,3,3-hexafluoro-1-propylpropyl carbonate, bis(1,1,1,3,3,3-hexafluoro-1-propyl) carbonate, ethylene carbonate (hereinafter also described as "EC"), propylene carbonate (hereinafter, also described as "PC"), butylene carbonate, fluoroethylene carbonate (hereinafter, also described as "FEC"), difluoroethylene carbonate, methyl acetate, ethyl acetate, methyl propionate, ethyl propionate, methyl 2-fluoropropionate, ethyl 2-fluoropropionate, diethyl ether, dibutyl ether, diisopropyl ether, 1,2-dimethoxyethane, tetrahydrofuran, 2-methyltetrahydrofuran, furan, tetrahydropyran, 1,3-dioxane, 1,4-dioxane, N,N-dimethylformamide, acetonitrile, propionitrile, dimethylsulfoxide, sulfolane, γ-butyrolactone, and γ-valerolactone.

In the present disclosure, an ionic liquid having a salt structure may be used as the nonaqueous organic solvent.

It is preferable that the nonaqueous organic solvent is at least one selected from the group consisting of a cyclic ester and a chain ester from a viewpoint of excellent input and output characteristics at low temperatures.

It is preferable that the above nonaqueous organic solvent is at least one selected from the group consisting of cyclic carbonates and chain carbonates from a viewpoint of excellent cycle characteristics at high temperatures.

It is preferable that the nonaqueous organic solvent contains a cyclic ester, and the cyclic ester is cyclic carbonate.

Specific examples of the above cyclic carbonate include EC, PC, butylene carbonate, and FEC, and at least one selected from the group consisting of EC, PC, and FEC is preferable.

It is preferable that the nonaqueous organic solvent contains a chain ester, and the chain ester is chain carbonate.

Specific examples of the above chain carbonate include EMC, DMC, DEC, methyl propyl carbonate, ethyl propyl carbonate, 2,2,2-trifluoroethyl methyl carbonate, 2,2,2-trifluoroethyl ethyl carbonate, 1,1,1,3,3,3-hexafluoro-1-propylmethyl carbonate, and 1,1,1,3,3,3-hexafluoro-1-propylethyl carbonate, and at least one selected from the group consisting of EMC, DMC, DEC, and methyl propyl carbonate is preferable.

Specific examples of the above ester include methyl acetate, ethyl acetate, methyl propionate, ethyl propionate, methyl 2-fluoropropionate, and ethyl 2-fluoropropionate.

Regarding Another Additive

An additive component commonly used in the nonaqueous electrolytic solution according to the present disclosure may be further added in any ratio as long as the gist of the present disclosure is not impaired.

Specific examples of another additive include compounds that have an overcharge prevention effect, a negative electrode film-forming effect, and a positive electrode protective effect, such as cyclohexylbenzene, cyclohexylfluorobenzene, fluorobenzene, biphenyl, difluoroanisole, tert-butylbenzene, tert-amylbenzene, 2-fluorotoluene, 2-fluorobiphenyl, vinylene carbonate, dimethylvinylene carbonate, vinylethylene carbonate, fluoroethylene carbonate, trans-difluoroethylene carbonate, methyl propargyl carbonate, ethyl propargyl carbonate, dipropargyl carbonate, maleic anhydride, succinic anhydride, 1,3-propanesultone, 1,3-propenesultone, butanesultone, 1,3,2-dioxathiolane-2,2-dioxide, 4-propyl-1,3,2-dioxathiolane-2,2-dioxide, methylene methanedisulfonate, dimethylene methanedisulfonate, trimethylene methanedisulfonate, methyl methanesulfonate, 1,6-diisocyanatohexane, tris(trimethylsilyl)borate, succinonitrile, (ethoxy)pentafluorocyclotriphosphazene, lithium difluorobis(oxalato)phosphate, sodium difluorobis(oxalato)phosphate, potassium difluorobis(oxalato)phosphate, lithium difluorooxalatoborate, sodium difluorooxalatoborate, potassium difluorooxalatoborate, lithium bis(oxalato)borate, sodium bis(oxalato)borate, potassium bis(oxalato)borate, lithium tetrafluorooxalatophosphate, sodium tetrafluorooxalatophosphate, potassium tetrafluorooxalatophosphate, lithium tris(oxalato)phosphate, sodium tris(oxalato)phosphate, potassium tris(oxalato)phosphate, lithium difluorophosphate, sodium difluorophosphate, potassium difluorophosphate, lithium monofluorophosphate, sodium monofluorophosphate, potassium monofluorophosphate, lithium fluorosulfonate, sodium fluorosulfonate, potassium fluorosulfonate, lithium bis(difluorophosphoryl)imide, sodium bis(difluorophosphoryl)imide, potassium bis(difluorophosphoryl)imide, methanesulfonyl fluoride, ethenesulfonyl fluoride, and phenyl difluorophosphate.

The nonaqueous electrolytic solution according to the present disclosure may contain at least one selected from the group consisting of vinylene carbonate, bis(oxalato)borate, difluorooxalatoborate, difluorobis(oxalato)phosphate, tetrafluorooxalatophosphate, (difluorophosphoryl)(fluorosulfonyl)imide salt, difluorophosphate, fluorosulfonate, 1,3-propenesultone, 1,3-propanesultone, 1,6-diisocyanatohexane, ethynylethylene carbonate, 1,3,2-dioxathiolane-2,2-dioxide, 4-propyl-1,3,2-dioxathiolane-2,2-dioxide, methylene methanedisulfonate, 1,2-ethanedisulfonic anhydride, methanesulfonyl fluoride, tris(trimethylsilyl)borate, (ethoxy)pentafluorocyclotriphosphazene, lithium tetrafluoro(malonato)phosphate, tetrafluoro(picolinato)phosphate, 1,3-dimethyl-1,3-divinyl-1,3-di(1,1, 1,3,3,3-bexafluoroisopropyl)disiloxane, t-butylbenzene, t-amylbenzene, fluorobenzene, and cyclohexylbenzene. A content of the above additive in the nonaqueous electrolytic solution is preferably 0.01% by mass or more and 5.0% by mass or less with respect to a total amount of the nonaqueous electrolytic solution.

The nonaqueous electrolytic solution according to the present disclosure may contain a compound represented by the following General Formula (3) as another additive.

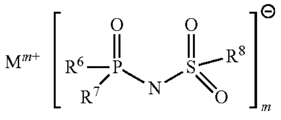

(3)

[In General Formula (3), $R^6$ to $R^8$ are each independently a fluorine atom or an organic group selected from a linear alkyl group having 1 to 10 carbon atoms, a branched alkyl group having 3 to 10 carbon atoms, a linear alkoxy group having 1 to 10 carbon atoms, a branched alkoxy group having 3 to 10 carbon atoms, an alkenyl group having 2 to 10 carbon atoms, an alkenyloxy group having 2 to 10 carbon atoms, an alkynyl group having 2 to 10 carbon atoms, an alkynyloxy group having 2 to 10 carbon atoms, a cycloalkyl group having 3 to 10 carbon atoms, a cycloalkoxy group having 3 to 10 carbon atoms, a cycloalkenyl group having 3 to 10 carbon atoms, a cycloalkenyloxy group having 3 to 10 carbon atoms, an aryl group having 6 to 10 carbon atoms, and an aryloxy group having 6 to 10 carbon atoms, and the organic group may have a fluorine atom, an oxygen atom, or an unsaturated bond. Here, at least one of $R^6$ to $R^8$ is a fluorine atom. $M^{m+}$ is an alkali metal cation, an alkaline earth metal cation, or an onium cation, and m represents the same integer as a valence of the corresponding cation.]

When the compound (salt having an imide anion) represented by General Formula (3) has at least one P—F bond or S—F bond, excellent low temperature characteristics can be obtained. The larger the number of P—F bonds and S—F bonds in the salt having the above imide anion, the more the low temperature characteristics can be further improved, which is preferable, and in the salt having the imide anion represented by the above General Formula (3), a compound in which all of $R^6$ to $R^8$ are fluorine atoms is more preferable.

In the salt having the imide anion represented by General Formula (3), at least one of $R^6$ to $R^8$ is a fluorine atom, and at least one of $R^6$ to $R^8$ is preferably a compound selected from hydrocarbon groups having 6 or less carbon atoms which may contain fluorine atoms.

In the salt having the imide anion represented by the above General Formula (3), it is preferable that at least one of $R^6$ to $R^8$ is a fluorine atom, and at least one of $R^6$ to $R^8$ is a compound selected from a methyl group, a methoxy group, an ethyl group, an ethoxy group, a propyl group, a propoxy group, a vinyl group, an allyl group, an allyloxy group, an ethynyl group, a 2-propynyl group, a 2-propynyloxy group, a phenyl group, a phenyloxy group, a 2,2-difluoroethyl group, a 2,2-difluoroethyloxy group, a 2,2,2-trifluoroethyl group, a 2,2,2-trifluoroethyloxy group, a 2,2,3,3-tetrafluoropropyl group, a 2,2,3,3-tetrafluoropropyloxy group, a 1,1,1,3,3,3-hexafluoroisopropyl group, and a 1,1,1,3,3,3-hexafluoroisopropyloxy group.

A counter cation $M^{m+}$ of the salt having the imide anion represented by General Formula (3) is preferably selected from the group consisting of lithium ions, sodium ions, potassium ions, and tetraalkylammonium ions.

In the above General Formula (3), examples of the alkyl group and the alkoxy group represented by $R^6$ to $R^8$ include alkyl groups having 1 to 10 carbon atoms, such as a methyl group, an ethyl group, a propyl group, an isopropyl group, a butyl group, a sec-butyl group, a tert-butyl group, a pentyl group, a 2,2-difluoroethyl group, 2,2,2-trifluoroethyl group, 2,2,3,3-tetrafluoropropyl group, and a 1,1,1,3,3,3-hexafluoroisopropyl group, fluorine-containing alkyl groups, and alkoxy groups derived from these groups.

Examples of the alkenyl group and the alkenyloxy group include alkenyl groups having 2 to 10 carbon atoms such as a vinyl group, an allyl group, a 1-propenyl group, an isopropenyl group, a 2-butenyl group, and a 1,3-butadienyl group, fluorine-containing alkenyl groups, and alkenyloxy groups derived from these groups.

Examples of the alkynyl group and the alkynyloxy group include alkynyl groups having 2 to 10 carbon atoms such as an ethynyl group, a 2-propynyl group, and a 1,1-dimethyl-2-propynyl group, fluorine-containing alkynyl groups, and alkynyloxy groups derived from these groups.

Examples of the cycloalkyl group and the cycloalkoxy group include cycloalkyl groups having 3 to 10 carbon atoms such as a cyclopentyl group and a cyclohexyl group, fluorine-containing cycloalkyl groups, and cycloalkoxy groups derived from these groups.

Examples of the cycloalkenyl group and the cycloalkenyloxy group include cycloalkenyl groups having 3 to 10 carbon atoms such as a cyclopentenyl group and a cyclohexenyl group, fluorine-containing cycloalkenyl groups, and cycloalkenyloxy groups derived from these groups.

Examples of the aryl group and the aryloxy group include aryl groups having 6 to 10 carbon atoms such as a phenyl group, a tolyl group, and an xylyl group, fluorine-containing aryl groups, and aryloxy groups derived from these groups.

Specific examples and synthesis methods of the salt having the imide anion represented by General Formula (3) include those described in WO2017/111143.

A content of another additive in the nonaqueous electrolytic solution is preferably 0.01% by mass or more and 8.0% by mass or less with respect to the total amount of the nonaqueous electrolytic solution.

When the ionic salt exemplified as the solute is less than 0.5 mol/L, which is the lower limit of the suitable concentration of the solute, in the nonaqueous electrolytic solution, the ionic salt can exert a negative electrode film-forming effect and a positive electrode protective effect as "another additive". In this case, the content in the nonaqueous electrolytic solution is preferably 0.01% by mass to 5.0% by mass.

For example, when the nonaqueous electrolytic solution battery is a lithium ion battery, examples of the ionic salt include lithium hexafluorophosphate, lithium tetrafluoroborate, lithium trifluoromethanesulfonate, lithium bis(trifluoromethanesulfonyl)imide, lithium bis(fluorosulfonyl)imide, and lithium (trifluoromethanesulfonyl)(fluorosulfonyl)imide, and when the nonaqueous electrolytic solution battery is a sodium ion battery, examples of the ionic salt include sodium hexafluorophosphate, sodium tetrafluoroborate, sodium trifluoromethanesulfonate, sodium bis(trifluoromethanesulfonyl)imide, sodium bis(fluorosulfonyl)imide, and sodium (trifluoromethanesulfonyl)(fluorosulfonyl)imide.

An alkali metal salt other than the above solutes may also be used as an additive.

Specific examples include carboxylates such as lithium acrylate, sodium acrylate, lithium methacrylate, and sodium methacrylate, and sulfate ester salts such as lithium methyl sulfate, sodium methyl sulfate, lithium ethyl sulfate, and sodium ethyl sulfate.

From a viewpoint of improving durability (life) of a battery, when the nonaqueous electrolytic solution battery is a lithium ion battery, the nonaqueous electrolytic solution according to the present disclosure is preferable to contain, with respect to the total amount of the nonaqueous electrolytic solution, 0.01% by mass to 5.0% by mass of at least one selected from vinylene carbonate, fluoroethylene carbonate, lithium bis(oxalato)borate, lithium difluorooxalatoborate, lithium difluorobis(oxalato)phosphate, lithium tetrafluorooxalatophosphate, lithium bis(fluorosulfonyl)imide, lithium (difluorophosphoryl)(fluorosulfonyl)imide, lithium difluorophosphate, lithium fluorosulfonate, 1,3-propenesultone, 1,3-propanesultone, 1,3,2-dioxathiolane-2,2-dioxide, and 4-propyl-1,3,2-dioxathiolane-2,2-dioxide in the above another additive.

When the nonaqueous electrolytic solution battery is a sodium ion battery, the nonaqueous electrolytic solution according to the present disclosure is preferable to contain, with respect to the total amount of the nonaqueous electrolytic solution, 0.01% by mass to 5.0% by mass of at least one selected from vinylene carbonate, fluoroethylene carbonate, sodium bis(oxalato)borate, sodium difluorooxalatoborate, sodium difluorobis(oxalato)phosphate, sodium tetrafluorooxalatophosphate, sodium bis(fluorosulfonyl)imide, sodium (difluorophosphoryl)(fluorosulfonyl)imide, sodium difluorophosphate, sodium fluorosulfonate, 1,3-propenesultone, 1,3-propanesultone, 1,3,2-dioxathiolane-2,2-dioxide, and 4-propyl-1,3,2-dioxathiolane-2,2-dioxide.

In addition, the nonaqueous electrolytic solution according to the present disclosure can also contain a polymer, and as in the case of being used in a nonaqueous electrolytic solution battery referred to as a polymer battery, the nonaqueous electrolytic solution can be quasi-solidified with a gelling agent or a cross-linked polymer. A polymer solid electrolyte includes one containing the nonaqueous organic solvent as a plasticizer.

The above polymer is not particularly limited as long as the polymer is an aprotic polymer capable of dissolving the compound represented by the above General Formula (1) or (2), the above solute, and the above another additive. Examples of the polymer include polymers having polyethylene oxide as a main chain or a side chain, homopolymers or copolymers of polyvinylidene fluoride, methacrylic acid ester polymers, and polyacrylonitrile. When a plasticizer is added to these polymers, an aprotic nonaqueous organic solvent is preferred among the above nonaqueous organic solvents.

2. Nonaqueous Electrolytic Solution Battery

The nonaqueous electrolytic solution battery according to the present disclosure at least includes the nonaqueous electrolytic solution according to the present disclosure described above, a negative electrode, and a positive electrode. Furthermore, a separator, an exterior body, and the like are preferably included.

Although the negative electrode is not particularly limited, it is preferable to use a material capable of reversibly intercalating and deintercalating alkali metal ions such as lithium ions and sodium ions, or alkaline earth metal ions.

For example, in the case of the lithium ion secondary battery in which cations are mainly lithium, the negative electrode active material constituting the negative electrode is capable of doping and dedoping lithium ions, and includes those containing at least one selected from, for example, a carbon material in which a d value of a lattice plane (002) plane in X-ray diffraction is 0.340 nm or less, a carbon material in which the d value of the lattice plane (002) plane in X-ray diffraction exceeds 0.340 nm, oxides of one or more metal selected from Si, Sn, and Al, one or more metals selected from Si, Sn, and Al, alloys containing these metals, alloys of these metals and lithium, or alloys of the above alloys and lithium, and lithium titanium oxide. One of these negative electrode active materials can be used alone, or two or more thereof can be used in combination. Lithium metal, metal nitrides, tin compounds, conductive polymers, and the like may also be used.

For example, in a case of a sodium ion secondary battery in which a cation is mainly sodium, as the negative electrode active material constituting the negative electrode, sodium metal, an alloy of sodium metal and other metals such as tin, an intermetallic compound, various carbon materials such as hard carbon, a metal oxide such as titanium oxide, a metal nitride, (elemental) tin, a tin compound, activated carbon, a conductive polymer, and the like are used. In addition to these, (elemental) phosphorus such as red phosphorus and black phosphorus, phosphorus compounds such as Co—P, Cu—P, Sn—P, Ge—P, and Mo—P, (elemental) antimony, antimony compounds such as Sb/C and Bi—Sb, and the like are used. One type of these negative electrode active materials may be used alone, or two or more types thereof may be used in combination.

Although the positive electrode is not particularly limited, it is preferable to use a material capable of reversibly intercalating and deintercalating alkali metal ions such as lithium ions and sodium ions, or alkaline earth metal ions.

For example, when the cation is lithium, lithium-containing transition metal composite oxides such as $LiCoO_2$, $LiNiO_2$, $LiMnO_2$, $LiMn_2O_4$, a mixture of a plurality of transition metals such as Co, Mn, and Ni and these lithium-containing transition metal composite oxides, those in which a part of the transition metals of these lithium-containing transition metal composite oxides is replaced by a metal other than the transition metals, phosphate compounds of transition metals such as $LiFePO_4$, $LiCoPO_4$, $LiMnPO_4$ referred to as olivine, oxides such as $TiO_2$, $V_2O_5$, and $MoO_3$, sulfides such as $TiS_2$ and FeS, conductive polymers such as polyacetylene, polyparaphenylene, polyaniline, and polypyrrole, activated carbon, radical-generating polymers, carbon materials, and the like, can be used as a positive electrode material.

For example, when the cation is sodium, sodium-containing transition metal composite oxides such as $NaCrO_2$, $NaFe_{0.5}Co_{0.5}O_2$, $NaFe_{0.4}Mn_{0.3}Ni_{0.3}O_2$, $NaNi_{0.5}Ti_{0.3}Mn_{0.2}O_2$, $NaNi_{1/3}Ti_{1/3}Mn_{1/3}O_2$, $NaNi_{0.33}Ti_{0.33}Mn_{0.16}Mg_{0.17}O_2$, $Na_{2/3}Ni_{1/3}Ti_{1/6}Mn_{1/2}O_2$, and $Na_{2/3}Ni_{1/3}Mn_{2/3}O_2$, a mixture of a plurality of transition metals such as Co, Mn, and Ni and these sodium-containing transition metal composite oxides, those in which a part of the transition metals of these sodium-containing transition metal composite oxides is replaced with other metals other than the transition metals, polyanion type compounds such as $NaFePO_4$, $NaVPO_4F$, $Na_3V_2(PO_4)_3$, and $Na_2Fe_2(SO_4)_3$, sodium salts of a Prussian Blue analogues represented by a composition formula $Na_aM_b[Fe(CN)_6]_c$ (M=Cr, Mn, Fe, Co, Ni, Cu, or Zn, $0 \leq a \leq 2$, $0.5 \leq b \leq 1.5$, $0.5 \leq c \leq 1.5$), oxides such as $TiO_2$, $V_2O_5$, and $MoO_3$, sulfides such as $TiS_2$ and FeS, conductive polymers such as polyacetylene, polyparaphenylene, polyaniline, and polypyrrole, activated carbon, radical-generating polymers, carbon materials, and the like, can be used as a positive electrode material (positive electrode active material).

As the positive electrode and negative electrode materials, acetylene black, ketjen black, carbon fiber, or graphite as a conductive material, and polytetrafluoroethylene, polyvinylidene fluoride, SBR resin, or the like as a binder are added, and an electrode sheet molded into a sheet shape can be used.

As a separator for preventing contact between the positive electrode and the negative electrode, a nonwoven fabric or porous sheet made of polyolefin, polyethylene, paper, glass fiber, or the like is used.

An electrochemical device having a shape such as a coin shape, a cylindrical shape, a prismatic shape, or an aluminum laminate sheet shape is assembled based on the above elements.

EXAMPLES

The present disclosure will be described in more detail below with reference to Examples, but the present disclosure is not limited by these descriptions.

Synthesis Example-1

After 7.0 g of EMC and 0.6 g of 2-pyrrolidone were put in a 50 ml eggplant flask, 1.0 g of fluorosulfonyl isocyanate was slowly added. After an internal temperature decreased to 25° C., 0.06 g of lithium hydride was added. After foaming ceased, concentration was carried out to obtain 1.4 g of Compound (1a) (yield: 94%). $^1$H NMR($CD_3CN$) $\delta_H$ 3.78, 2.52 ppm, $^{19}$F NMR($CD_3CN$) $\delta_F$ 49.0 ppm.

Synthesis Example-2

After 7.0 g of EMC and 0.6 g of 2-imidazolidinone were put in a 50 ml eggplant flask, 1.0 g of fluorosulfonyl isocyanate was slowly added. After an internal temperature decreased to 25° C., 0.06 g of lithium hydride was added. After foaming ceased, concentration was carried out to obtain 1.4 g of Compound (1g) (yield: 92%). $^1$H NMR ($CD_3CN$) $\delta_H$ 3.78, 3.34 ppm, $^{19}$F NMR($CD_3CN$) $\delta_F$ 52.7 ppm.

Although the synthesis of Compounds (1a) and (1g) has been described here, Compounds (1c), (1e), (1f), and (1i) used in Examples described later were obtained in the same manner as described above, except that corresponding raw materials were changed.

Synthesis Example-3

After 7.0 g of EMC and 0.6 g of 2-imidazolidinone were put in a 50 ml eggplant flask, 2.0 g of fluorosulfonyl isocyanate was slowly added. After an internal temperature decreased to 25° C., 0.12 g of lithium hydride was added. After foaming ceased, concentration was carried out to obtain 2.3 g of Compound (2a) (yield: 95%). $^1$H NMR ($CD_3CN$) $\delta_H$ 3.76 ppm, $^{19}$F NMR($CD_3CN$) $\delta_F$ 49.3 ppm.

Although the synthesis of Compound (2a) has been described here, Compounds (2d), (2l), and (2p) used in Examples described later were obtained in the same manner as described above, except that the corresponding raw materials were changed.

PREPARATION OF NONAQUEOUS ELECTROLYTIC SOLUTIONS OF EXAMPLES AND COMPARATIVE EXAMPLES

Comparative Example 1-1

Preparation of $LiPF_6$ Solution

EC, FEC, EMC, and DMC were mixed in a volume ratio of EC:FEC:EMC:DMC=2:1:3:4 in a glove box with a dew point of −60°C. or lower (Component (III)). After that, $LiPF_6$ (Component (II)) with an amount which is a concentration of 1.0 mol/L was added while maintaining an internal temperature at 40° C. or lower, was stirred, and completely dissolved to obtain a $LiPF_6$ solution. This $LiPF_6$ solution was set as Comparative Nonaqueous Electrolytic Solution 1-1.

Example 1-1

Preparation of Nonaqueous Electrolytic Solution 1-1

EC, FEC, EMC, and DMC were mixed in a volume ratio of EC:FEC:EMC:DMC=2:1:3:4 in a glove box with a dew point of −60° C. or lower (Component (III)). After that, $LiPF_6$ (Component (II)) of the 1.0 mol/L was added while maintaining the internal temperature at 40° C. or lower, Compound (1a) corresponding to the compound represented by General Formula (1) (Component (I)) was added to 0.5% by mass with respect to the total amount of Component (I), Component (II), and Component (III), and was stirred and dissolved for one hour to obtain Nonaqueous Electrolytic Solution 1-1 according to Example 1-1.

Examples 1-2 to 1-8, Comparative Examples 1-2 to 1-5

Preparation of Nonaqueous Electrolytic Solutions 1-2 to 1-8 and Comparative Nonaqueous Electrolytic Solutions 1-2 to 1-5

Except that the type and adding amount of Component (I) (or comparative compound) are changed as described in Table 1, Nonaqueous Electrolytic Solutions 1-2 to 1-8 and Comparative Nonaqueous Electrolytic Solutions 1-2 to 1-5 were obtained in the same way as the preparation of Nonaqueous Electrolytic Solution 1-1.

Examples 2-1 and 2-2, Comparative Examples 2-1 to 2-3

Preparation of Nonaqueous Electrolytic Solutions 2-1 and 2-2 and Comparative Nonaqueous Electrolytic Solutions 2-1 to 2-3

Furthermore, except that vinylene carbonate as another additive was added to a concentration described in Table 2 and dissolved, Nonaqueous Electrolytic Solutions 2-1 and 2-2 and Comparative Nonaqueous Electrolytic Solutions 2-1 to 2-3 were respectively obtained in the same way as the preparation of Nonaqueous Electrolytic Solutions 1-2 and 1-6 and Comparative Nonaqueous Electrolytic Solutions 1-1, 1-3, and 1-5.

Examples 3-1 and 3-2, Comparative Examples 3-1 to 3-3

Preparation of Nonaqueous Electrolytic Solutions 3-1 and 3-2 and Comparative Nonaqueous Electrolytic Solutions 3-1 to 3-3

Except that vinylene carbonate was changed to lithium bis(oxalato)borate, Nonaqueous Electrolytic Solutions 3-1 and 3-2 and Comparative Nonaqueous Electrolytic Solutions 3-1 to 3-3 were respectively obtained in the same way as the preparation of Nonaqueous Electrolytic Solutions 2-1 and 2-2 and Comparative Nonaqueous Electrolytic Solutions 2-1 to 2-3.

Examples 4-1 and 4-2, Comparative Examples 4-1 to 4-3

Preparation of Nonaqueous Electrolytic Solutions 4-1 and 4-2 and Comparative Nonaqueous Electrolytic Solutions 4-1 to 4-3

Except that vinylene carbonate was changed to lithium difluorobis(oxalato)phosphate, Nonaqueous Electrolytic Solutions 4-1 and 4-2 and Comparative Nonaqueous Electrolytic Solutions 4-1 to 4-3 were respectively obtained in the same way as the preparation of Nonaqueous Electrolytic Solutions 2-1 and 2-2 and Comparative Nonaqueous Electrolytic Solutions 2-1 to 2-3.

Examples 5-1 and 5-2, Comparative Examples 5-1 to 5-3

Preparation of Nonaqueous Electrolytic Solutions 5-1 and 5-2 and Comparative Nonaqueous Electrolytic Solutions 5-1 to 5-3

Except that vinylene carbonate was changed to lithium tetrafluorooxalatophosphate, Nonaqueous Electrolytic Solutions 5-1 and S-2 and Comparative Nonaqueous Electrolytic Solutions 5-1 to 5-3 were respectively obtained in the same way as the preparation of Nonaqueous Electrolytic Solutions 2-1 and 2-2 and Comparative Nonaqueous Electrolytic Solutions 2-1 to 2-3.

Examples 6-1 and 6-2, Comparative Examples 6-1 to 6-3

Preparation of Nonaqueous Electrolytic Solutions 6-1 and 6-2 and Comparative Nonaqueous Electrolytic Solutions 6-1 to 6-3

Except that vinylene carbonate was changed to lithium bis(fluorosulfonyl)imide, Nonaqueous Electrolytic Solutions 6-1 and 6-2 and Comparative Nonaqueous Electrolytic Solutions 6-1 to 6-3 were respectively obtained in the same way as the preparation of Nonaqueous Electrolytic Solutions 2-1 and 2-2 and Comparative Nonaqueous Electrolytic Solutions 2-1 to 2-3.

Examples 7-1 and 7-2, Comparative Examples 7-1 to 7-3

Preparation of Nonaqueous Electrolytic Solutions 7-1 and 7-2 and Comparative Nonaqueous Electrolytic Solutions 7-1 to 7-3

Except that vinylene carbonate was changed to lithium difluorophosphate, Nonaqueous Electrolytic Solutions 7-1 and 7-2 and Comparative Nonaqueous Electrolytic Solutions 7-1 to 7-3 were respectively obtained in the same way as the preparation of Nonaqueous Electrolytic Solutions 2-1 and 2-2 and Comparative Nonaqueous Electrolytic Solutions 2-1 to 2-3.

Examples 8-1 to 8-10, Comparative Examples 8-1 to 8-3

Preparation of Nonaqueous Electrolytic Solutions 8-1 to 8-10 and Comparative Nonaqueous Electrolytic Solutions 8-1 to 8-3

Except that lithium fluorosulfonate was added as another additive to a concentration shown in Table 8 and dissolved, and the type and adding amount of Component (I) (or comparative compound) were changed as shown in Table 8, Nonaqueous Electrolytic Solutions 8-1 to 8-10 and Comparative Nonaqueous Electrolytic Solutions 8-1 to 8-3 were obtained in the same way as the preparation of Nonaqueous Electrolytic Solution 1-1.

In the following Tables 1 to 8, MP means N-methylpyrrolidone, DMI means 1,3-dimethylimidazolidinone, VC means vinylene carbonate, BOB means lithium bis(oxalato) borate, DFBOP means lithium difluorobis(oxalato)phosphate, TFOP means lithium tetrafluorooxalatophosphate, FSI means lithium bis(fluorosulfonyl)imide, DFP means lithium difluorophosphate, and FS means lithium fluorosulfonate.

In the following Tables 1 to 8, the adding amount of Component (I) (or comparative compound) represents a concentration with respect to the total amount of Component (I) (or comparative compound), Component (II), and Component (III). Further, an adding amount of another additive represents a concentration relative to a total amount of Component (I) (or comparative compound), Component (II), Component (III), and another additive.

Production of Nonaqueous Electrolytic Solution Battery

Production of NCM622 Positive Electrode

5% by mass of polyvinylidene fluoride (hereinafter, also described as PVDF) as a binder and 5% by mass of acetylene black as a conductive material were mixed to 90% by mass of $LiNi_{0.6}Co_{0.2}Mn_{0.2}O_2$ powder, and N-methyl-2-pyrrolidone was further added to produce a positive electrode mixture paste. The paste was applied onto both sides of aluminum foil (A1085), dried and pressed, and then punched into 4 cm×5 cm to obtain an NCM622 positive electrode for test.

Production of NCM811 Positive Electrode 3.5% by mass of polyvinylidene fluoride as a binder and 4.5% by mass of acetylene black as a conductive material were mixed to 92.0% by mass of $LiNi_{0.8}Co_{0.1}Mn_{0.1}O_2$ powder, and N-methyl-2-pyrrolidone was further added to produce a positive electrode mixture paste. The paste was applied onto both sides of aluminum foil (A1085), dried and pressed, and then punched into 4 cm×5 cm to obtain an NCM811 positive electrode for test.

Production of Artificial Graphite Negative Electrode

90% by mass of artificial graphite powder, 5% by mass of PVDF as a binder, and 5% by mass of acetylene black as a conductive material were mixed, and N-methyl-2-pyrrolidone was further added to produce a negative electrode mixture paste. The paste was applied onto one side of copper foil, dried and pressed, and then punched into 4 cm×5 cm to obtain an artificial graphite negative electrode for test.

Production of Silicon-Containing Graphite Negative Electrode

To 85% by mass of artificial graphite powder, 7% by mass of nanosilicon, 3% by mass of conductive material (HS-100), 2% by mass of carbon nanofiber (VGCF), 2% by mass of styrene-butadiene rubber, 1% by mass of sodium carboxymethylcellulose, and water were mixed, and a negative electrode mixture paste was produced. The paste was applied onto one side of copper foil, dried and pressed, and then punched into 4 cm×5 cm to obtain a silicon-containing graphite negative electrode for test.

Production of Nonaqueous Electrolytic Solution Battery

Terminals were welded to the above NCM622 positive electrode under an argon atmosphere at a dew point of −50° C. or lower, and both sides thereof were then stacked between two polyethylene separators (5 cm×6 cm), and outsides thereof were stacked between two artificial graphite negative electrodes to which terminals had been welded in advance so that a surface of the negative electrode active material faces opposite to a surface of the positive electrode active material. The stacked product was put in an aluminum laminated bag having an opening on one side, the nonaqueous electrolytic solution was vacuum-injected into the bag, and the opening was then sealed with heat to produce aluminum laminated nonaqueous electrolytic solution batteries according to Examples and Comparative Examples. The nonaqueous electrolytic solution were those described in Tables 1 to 8.

In Examples 9-1 to 9-8, Comparative Examples 9-1 to 9-5, Examples 10-1 to 10-2, Comparative Examples 10-1 to 10-3, Examples 11-1 to 11-2, Comparative Examples 11-1 to 11-3, Examples 12-1 to 12-2, Comparative Examples 12-1 to 12-3, Examples 13-1 to 13-2, Comparative Examples 13-1 to 13-3, Examples 14-1 to 14-2, Comparative Examples 14-1 to 14-3, Examples 15-1 to 15-2, Comparative Examples 15-1 to 15-3, Examples 16-1 to 16-10, and Comparative Examples 16-1 to 16-3, NCM811 as the positive electrode and silicon-containing graphite as the negative electrode were used to produce a nonaqueous electrolytic solution battery in the same manner. The nonaqueous electrolytic solution were those described in Tables 9 to 16.

Evaluation

Initial Charge and Discharge

The produced nonaqueous electrolytic solution battery was put in a 25° C. constant temperature bath and, in this state, connected to a charge and discharge device. Charge was performed at 3 mA until 4.3 V. After 4.3 V was maintained for one hour, discharge was performed at 6 mA until 2.7 V. This was one charge and discharge cycle, and three cycles in total of charge and discharge were performed to stabilize the battery.

Measurement of Initial Resistance

After the initial charge and discharge, the battery was charged at 25° C. and 6 mA until 4.3 V, and a resistance value was directly measured by impedance measurement.

In each of Tables 1 to 16, the initial resistance value of Comparative Example using the comparative nonaqueous electrolytic solution to which neither Component (I) nor a comparative compound had been added (Comparative Example 1-1 in Table 1, Comparative Example 2-1 in Table 2, Comparative Example 3-1 in Table 3, Comparative Example 4-1 in Table 4, Comparative Example 5-1 in Table 5, Comparative Example 6-1 in Table 6, Comparative Example 7-1 in Table 7, Comparative Example 8-1 in Table 8, Comparative Example 9-1 in Table 9, Comparative Example 10-1 in Table 10, Comparative Example 11-1 in Table 11, Comparative Example 12-1 in Table 12, Comparative Example 13-1 in Table 13, Comparative Example 14-1 in Table 14, Comparative Example 15-1 in Table 15, and Comparative Example 16-1 in Table 16) was shown as 100, and an evaluation result of the initial resistance in each of Examples and Comparative Examples was shown as a relative value.

TABLE 1

| | | Component (I) or comparative compound | | Another additive | | Initial resistance |
|---|---|---|---|---|---|---|
| | Nonaqueous electrolytic solution | Type | Adding amount [% by mass] | Type | Adding amount [% by mass] | (relative value) |
| Example 1-1 | Nonaqueous Electrolytic Solution 1-1 | (1a) | 0.5 | — | — | 85.3 |
| Example 1-2 | Nonaqueous Electrolytic Solution 1-2 | (1a) | 1.0 | — | — | 75.8 |
| Example 1-3 | Nonaqueous Electrolytic Solution 1-3 | (2a) | 0.05 | — | | 97.2 |
| Example 1-4 | Nonaqueous Electrolytic Solution 1-4 | (2a) | 0.1 | — | — | 89.5 |
| Example 1-5 | Nonaqueous Electrolytic Solution 1-5 | (2a) | 0.5 | — | — | 84.0 |
| Example 1-6 | Nonaqueous Electrolytic Solution 1-6 | (2a) | 1.0 | — | — | 72.3 |
| Example 1-7 | Nonaqueous Electrolytic Solution 1-7 | (2a) | 2.0 | — | — | 86.8 |
| Example 1-8 | Nonaqueous Electrolytic Solution 1-8 | (2a) | 5.0 | — | | 98.3 |

TABLE 1-continued

| | Nonaqueous electrolytic solution | Component (I) or comparative compound Type | Adding amount [% by mass] | Another additive Type | Adding amount [% by mass] | Initial resistance (relative value) |
|---|---|---|---|---|---|---|
| Comparative Example 1-1 | Comparative Nonaqueous Electrolytic Solution 1-1 | — | — | — | — | 100 |
| Comparative Example 1-2 | Comparative Nonaqueous Electrolytic Solution 1-2 | MP | 0.5 | — | — | 101.5 |
| Comparative Example 1-3 | Comparative Nonaqueous Electrolytic Solution 1-3 | MP | 1.0 | — | — | 103.6 |
| Comparative Example 1-4 | Comparative Nonaqueous Electrolytic Solution 1-4 | DMI | 0.5 | — | — | 100.7 |
| Comparative Example 1-5 | Comparative Nonaqueous Electrolytic Solution 1-5 | DMI | 1.0 | — | — | 103.1 |

TABLE 2

| | Nonaqueous electrolytic solution | Component (I) or comparative compound Type | Adding amount [% by mass] | Another additive Type | Adding amount [% by mass] | Initial resistance (relative value) |
|---|---|---|---|---|---|---|
| Example 2-1 | Nonaqueous Electrolytic Solution 2-1 | (1a) | 1.0 | VC | 1.0 | 76.5 |
| Example 2-2 | Nonaqueous Electrolytic Solution 2-2 | (2a) | 1.0 | VC | 1.0 | 73.1 |
| Comparative Example 2-1 | Comparative Nonaqueous Electrolytic Solution 2-1 | — | — | VC | 1.0 | 100 |
| Comparative Example 2-2 | Comparative Nonaqueous Electrolytic Solution 2-2 | MP | 1.0 | VC | 1.0 | 102.5 |
| Comparative Example 2-3 | Comparative Nonaqueous Electrolytic Solution 2-3 | DMI | 1.0 | VC | 1.0 | 101.1 |

TABLE 3

| | Nonaqueous electrolytic solution | Component (I) or comparative compound Type | Adding amount [% by mass] | Another additive Type | Adding amount [% by mass] | Initial resistance (relative value) |
|---|---|---|---|---|---|---|
| Example 3-1 | Nonaqueous Electrolytic Solution 3-1 | (1a) | 1.0 | BOB | 1.0 | 72.1 |
| Example 3-2 | Nonaqueous Electrolytic Solution 3-2 | (2a) | 1.0 | BOB | 1.0 | 69.5 |
| Comparative Example 3-1 | Comparative Nonaqueous Electrolytic Solution 3-1 | — | — | BOB | 1.0 | 100 |
| Comparative Example 3-2 | Comparative Nonaqueous Electrolytic Solution 3-2 | MP | 1.0 | BOB | 1.0 | 100.1 |
| Comparative Example 3-3 | Comparative Nonaqueous Electrolytic Solution 3-3 | DMI | 1.0 | BOB | 1.0 | 99.5 |

TABLE 4

| | Nonaqueous electrolytic solution | Component (I) or comparative compound Type | Adding amount [% by mass] | Another additive Type | Adding amount [% by mass] | Initial resistance (relative value) |
|---|---|---|---|---|---|---|
| Example 4-1 | Nonaqueous Electrolytic Solution 4-1 | (1a) | 1.0 | DFBOP | 1.0 | 65.3 |

TABLE 4-continued

| | Nonaqueous electrolytic solution | Component (I) or comparative compound Type | Adding amount [% by mass] | Another additive Type | Adding amount [% by mass] | Initial resistance (relative value) |
|---|---|---|---|---|---|---|
| Example 4-2 | Nonaqueous Electrolytic Solution 4-2 | (2a) | 1.0 | DFBOP | 1.0 | 64.1 |
| Comparative Example 4-1 | Comparative Nonaqueous Electrolytic Solution 4-1 | — | — | DFBOP | 1.0 | 100 |
| Comparative Example 4-2 | Comparative Nonaqueous Electrolytic Solution 4-2 | MP | 1.0 | DFBOP | 1.0 | 101.2 |
| Comparative Example 4-3 | Comparative Nonaqueous Electrolytic Solution 4-3 | DMI | 1.0 | DFBOP | 1.0 | 101.3 |

TABLE 5

| | Nonaqueous electrolytic solution | Component (I) or comparative compound Type | Adding amount [% by mass] | Another additive Type | Adding amount [% by mass] | Initial resistance (relative value) |
|---|---|---|---|---|---|---|
| Example 5-1 | Nonaqueous Electrolytic Solution 5-1 | (1a) | 1.0 | TFOP | 1.0 | 68.1 |
| Example 5-2 | Nonaqueous Electrolytic Solution 5-2 | (2a) | 1.0 | TFOP | 1.0 | 65.0 |
| Comparative Example 5-1 | Comparative Nonaqueous Electrolytic Solution 5-1 | — | — | TFOP | 1.0 | 100 |
| Comparative Example 5-2 | Comparative Nonaqueous Electrolytic Solution 5-2 | MP | 1.0 | TFOP | 1.0 | 100.2 |
| Comparative Example 5-3 | Comparative Nonaqueous Electrolytic Solution 5-3 | DMI | 1.0 | TFOP | 1.0 | 102.2 |

TABLE 6

| | Nonaqueous electrolytic solution | Component (I) or comparative compound Type | Adding amount [% by mass] | Another additive Type | Adding amount [% by mass] | Initial resistance (relative value) |
|---|---|---|---|---|---|---|
| Example 6-1 | Nonaqueous Electrolytic Solution 6-1 | (1a) | 1.0 | FSI | 1.0 | 72.3 |
| Example 6-2 | Nonaqueous Electrolytic Solution 6-2 | (2a) | 1.0 | FSI | 1.0 | 70.5 |
| Comparative Example 6-1 | Comparative Nonaqueous Electrolytic Solution 6-1 | — | — | FSI | 1.0 | 100 |
| Comparative Example 6-2 | Comparative Nonaqueous Electrolytic Solution 6-2 | MP | 1.0 | FSI | 1.0 | 101.3 |
| Comparative Example 6-3 | Comparative Nonaqueous Electrolytic Solution 6-3 | DMI | 1.0 | FSI | 1.0 | 100.0 |

TABLE 7

| | Nonaqueous | Component (I) or comparative compound | | Another additive | | Initial resistance |
| --- | --- | --- | --- | --- | --- | --- |
| | electrolytic solution | Type | Adding amount [% by mass] | Type | Adding amount [% by mass] | (relative value) |
| Example 7-1 | Nonaqueous Electrolytic Solution 7-1 | (1a) | 1.0 | DFP | 1.0 | 65.5 |
| Example 7-2 | Nonaqueous Electrolytic Solution 7-2 | (2a) | 1.0 | DFP | 1.0 | 64.7 |
| Comparative Example 7-1 | Comparative Nonaqueous Electrolytic Solution 7-1 | — | — | DFP | 1.0 | 100 |
| Comparative Example 7-2 | Comparative Nonaqueous Electrolytic Solution 7-2 | MP | 1.0 | DFP | 1.0 | 104.4 |
| Comparative Example 7-3 | Comparative Nonaqueous Electrolytic Solution 7-3 | DMI | 1.0 | DFP | 1.0 | 102.8 |

TABLE 8

| | Nonaqueous | Component (I) or comparative compound | | Another additive | | Initial resistance |
| --- | --- | --- | --- | --- | --- | --- |
| | electrolytic solution | Type | Adding amount [% by mass] | Type | Adding amount [% by mass] | (relative value) |
| Example 8-1 | Nonaqueous Electrolytic Solution 8-1 | (1a) | 1.0 | FS | 1.0 | 76.5 |
| Example 8-2 | Nonaqueous Electrolytic Solution 8-2 | (2a) | 1.0 | FS | 1.0 | 74.1 |
| Example 8-3 | Nonaqueous Electrolytic Solution 8-3 | (1c) | 1.0 | FS | 1.0 | 77.9 |
| Example 8-4 | Nonaqueous Electrolytic Solution 8-4 | (1e) | 1.0 | FS | 1.0 | 75.0 |
| Example 8-5 | Nonaqueous Electrolytic Solution 8-5 | (1f) | 1.0 | FS | 1.0 | 77.1 |
| Example 8-6 | Nonaqueous Electrolytic Solution 8-6 | (1g) | 1.0 | FS | 1.0 | 79.5 |
| Example 8-7 | Nonaqueous Electrolytic Solution 8-7 | (1i) | 1.0 | FS | 1.0 | 78.3 |
| Example 8-8 | Nonaqueous Electrolytic Solution 8-8 | (2d) | 1.0 | FS | 1.0 | 74.5 |
| Example 8-9 | Nonaqueous Electrolytic Solution 8-9 | (2l) | 1.0 | FS | 1.0 | 75.1 |
| Example 8-10 | Nonaqueous Electrolytic Solution 8-10 | (2p) | 1.0 | FS | 1.0 | 75.9 |
| Comparative Example 8-1 | Comparative Nonaqueous Electrolytic Solution 8-1 | — | — | FS | 1.0 | 100 |
| Comparative Example 8-2 | Comparative Nonaqueous Electrolytic Solution 8-2 | MI | 1.0 | FS | 1.0 | 103.5 |
| Comparative Example 8-3 | Comparative Nonaqueous Electrolytic Solution 8-3 | DMI | 1.0 | FS | 1.0 | 102.9 |

TABLE 9

| | | Component (I) or comparative compound | | Another additive | | Initial |
| --- | --- | --- | --- | --- | --- | --- |
| | Nonaqueous electrolytic solution | Type | Adding amount [% by mass] | Type | Adding amount [% by mass] | resistance (relative value) |
| Example 9-1 | Nonaqueous Electrolytic Solution 1-1 | (1a) | 0.5 | — | — | 86.2 |

TABLE 9-continued

| | Nonaqueous electrolytic solution | Component (I) or comparative compound | | Another additive | | Initial resistance (relative value) |
|---|---|---|---|---|---|---|
| | | Type | Adding amount [% by mass] | Type | Adding amount [% by mass] | |
| Example 9-2 | Nonaqueous Electrolytic Solution 1-2 | (1a) | 1.0 | — | — | 76.6 |
| Example 9-3 | Nonaqueous Electrolytic Solution 1-3 | (2a) | 0.05 | — | — | 98.7 |
| Example 9-4 | Nonaqueous Electrolytic Solution 1-4 | (2a) | 0.1 | — | — | 92.1 |
| Example 9-5 | Nonaqueous Electrolytic Solution 1-5 | (2a) | 0.5 | — | — | 87.2 |
| Example 9-6 | Nonaqueous Electrolytic Solution 1-6 | (2a) | 1.0 | — | — | 72.3 |
| Example 9-7 | Nonaqueous Electrolytic Solution 1-7 | (2a) | 2.0 | — | — | 88.6 |
| Example 9-8 | Nonaqueous Electrolytic Solution 1-8 | (2a) | 5.0 | — | — | 99.2 |
| Comparative Example 9-1 | Comparative Nonaqueous Electrolytic Solution 1-1 | — | — | — | — | 100 |
| Comparative Example 9-2 | Comparative Nonaqueous Electrolytic Solution 1-2 | MP | 0.5 | — | — | 102.3 |
| Comparative Example 9-3 | Comparative Nonaqueous Electrolytic Solution 1-3 | MP | 1.0 | — | — | 103.7 |
| Comparative Example 9-4 | Comparative Nonaqueous Electrolytic Solution 1-4 | DMI | 0.5 | — | — | 101.0 |
| Comparative Example 9-5 | Comparative Nonaqueous Electrolytic Solution 1-5 | DMI | 1.0 | — | — | 102.7 |

TABLE 10

| | Nonaqueous electrolytic solution | Component (I) or comparative compound | | Another additive | | Initial resistance (relative value) |
|---|---|---|---|---|---|---|
| | | Type | Adding amount [% by mass] | Type | Adding amount [% by mass] | |
| Example 10-1 | Nonaqueous Electrolytic Solution 2-1 | (1a) | 1.0 | VC | 1.0 | 77.1 |
| Example 10-2 | Nonaqueous Electrolytic Solution 2-2 | (2a) | 1.0 | VC | 1.0 | 74.3 |
| Comparative Example 10-1 | Comparative Nonaqueous Electrolytic Solution 2-1 | — | — | VC | 1.0 | 100 |
| Comparative Example 10-2 | Comparative Nonaqueous Electrolytic Solution 2-2 | MP | 1.0 | VC | 1.0 | 102.4 |
| Comparative Example 10-3 | Comparative Nonaqueous Electrolytic Solution 2-3 | DMI | 1.0 | VC | 1.0 | 100.9 |

TABLE 11

| | Nonaqueous electrolytic solution | Component (I) or comparative compound | | Another additive | | Initial resistance (relative value) |
|---|---|---|---|---|---|---|
| | | Type | Adding amount [% by mass] | Type | Adding amount [% by mass] | |
| Example 11-1 | Nonaqueous Electrolytic Solution 3-1 | (1a) | 1.0 | BOB | 1.0 | 73 |
| Example 11-2 | Nonaqueous Electrolytic Solution 3-2 | (2a) | 1.0 | BOB | 1.0 | 70.4 |

TABLE 11-continued

| | Nonaqueous electrolytic solution | Component (I) or comparative compound Type | Adding amount [% by mass] | Another additive Type | Adding amount [% by mass] | Initial resistance (relative value) |
|---|---|---|---|---|---|---|
| Comparative Example 11-1 | Comparative Nonaqueous Electrolytic Solution 3-1 | — | — | BOB | 1.0 | 100 |
| Comparative Example 11-2 | Comparative Nonaqueous Electrolytic Solution 3-2 | MP | 1.0 | BOB | 1.0 | 100.5 |
| Comparative Example 11-3 | Comparative Nonaqueous Electrolytic Solution 3-3 | DMI | 1.0 | BOB | 1.0 | 100.9 |

TABLE 12

| | Nonaqueous electrolytic solution | Component (I) or comparative compound Type | Adding amount [% by mass] | Another additive Type | Adding amount [% by mass] | Initial resistance (relative value) |
|---|---|---|---|---|---|---|
| Example 12-1 | Nonaqueous Electrolytic Solution 4-1 | (1a) | 1.0 | DFBOP | 1.0 | 67.2 |
| Example 12-2 | Nonaqueous Electrolytic Solution 4-2 | (2a) | 1.0 | DFBOP | 1.0 | 64.1 |
| Comparative Example 12-1 | Comparative Nonaqueous Electrolytic Solution 4-1 | — | — | DFBOP | 1.0 | 100 |
| Comparative Example 12-2 | Comparative Nonaqueous Electrolytic Solution 4-2 | MP | 1.0 | DFBOP | 1.0 | 103.5 |
| Comparative Example 12-3 | Comparative Nonaqueous Electrolytic Solution 4-3 | DMI | 1.0 | DFBOP | 1.0 | 102.1 |

TABLE 13

| | Nonaqueous electrolytic solution | Component (I) or comparative compound Type | Adding amount [% by mass] | Another additive Type | Adding amount [% by mass] | Initial resistance (relative value) |
|---|---|---|---|---|---|---|
| Example 13-1 | Nonaqueous Electrolytic Solution 5-1 | (1a) | 1.0 | TFOP | 1.0 | 66.6 |
| Example 13-2 | Nonaqueous Electrolytic Solution 5-2 | (2a) | 1.0 | TFOP | 1.0 | 68.9 |
| Comparative Example 13-1 | Comparative Electrolytic Solution 5-1 | — | — | TFOP | 1.0 | 100 |
| Comparative Example 13-2 | Comparative Nonaqueous Electrolytic Solution 5-2 | MP | 1.0 | TFOP | 1.0 | 102.1 |
| Comparative Example 13-3 | Comparative Nonaqueous Electrolytic Solution 5-3 | DMI | 1.0 | TFOP | 1.0 | 105.2 |

TABLE 14

| | Nonaqueous electrolytic solution | Component (I) or comparative compound Type | Adding amount [% by mass] | Another additive Type | Adding amount [% by mass] | Initial resistance (relative value) |
|---|---|---|---|---|---|---|
| Example 14-1 | Nonaqueous Electrolytic Solution 6-1 | (1a) | 1.0 | FSI | 1.0 | 68.1 |
| Example 14-2 | Nonaqueous Electrolytic Solution 6-2 | (2a) | 1.0 | FSI | 1.0 | 68.3 |

TABLE 14-continued

| | Nonaqueous electrolytic solution | Component (I) or comparative compound Type | Adding amount [% by mass] | Another additive Type | Adding amount [% by mass] | Initial resistance (relative value) |
|---|---|---|---|---|---|---|
| Comparative Example 14-1 | Comparative Nonaqueous Electrolytic Solution 6-1 | — | — | FSI | 1.0 | 100 |
| Comparative Example 14-2 | Comparative Nonaqueous Electrolytic Solution 6-2 | MP | 1.0 | FSI | 1.0 | 101.5 |
| Comparative Example 14-3 | Comparative Nonaqueous Electrolytic Solution 6-3 | DMI | 1.0 | FSI | 1.0 | 103.2 |

TABLE 15

| | Nonaqueous electrolytic solution | Component (I) or comparative compound Type | Adding amount [% by mass] | Another additive Type | Adding amount [% by mass] | Initial resistance (relative value) |
|---|---|---|---|---|---|---|
| Example 15-1 | Nonaqueous Electrolytic Solution 7-1 | (1a) | 1.0 | DFP | 1.0 | 74.1 |
| Example 15-2 | Nonaqueous Electrolytic Solution 7-2 | (2a) | 1.0 | DFP | 1.0 | 70.8 |
| Comparative Example 15-1 | Comparative Nonaqueous Electrolytic Solution 7-1 | — | — | DFP | 1.0 | 100 |
| Comparative Example 15-2 | Comparative Nonaqueous Electrolytic Solution 7-2 | MP | 1.0 | DFP | 1.0 | 105.2 |
| Comparative Example 15-3 | Comparative Nonaqueous Electrolytic Solution 7-3 | DMI | 1.0 | DFP | 1.0 | 104.1 |

TABLE 16

| | Nonaqueous electrolytic solution | Component (I) or comparative compound Type | Adding amount [% by mass] | Another additive Type | Adding amount [% by mass] | Initial resistance (relative value) |
|---|---|---|---|---|---|---|
| Example 16-1 | Nonaqueous Electrolytic Solution 8-1 | (1a) | 1.0 | FS | 1.0 | 77.2 |
| Example 16-2 | Nonaqueous Electrolytic Solution 8-2 | (2a) | 1.0 | FS | 1.0 | 78.3 |
| Example 16-3 | Nonaqueous Electrolytic Solution 8-3 | (1c) | 1.0 | FS | 1.0 | 80.4 |
| Example 16-4 | Nonaqueous Electrolytic Solution 8-4 | (1e) | 1.0 | FS | 1.0 | 78.1 |
| Example 16-5 | Nonaqueous Electrolytic Solution 8-5 | (1f) | 1.0 | FS | 1.0 | 79.2 |
| Example 16-6 | Nonaqueous Electrolytic Solution 8-6 | (1g) | 1.0 | FS | 1.0 | 81.5 |
| Example 16-7 | Nonaqueous Electrolytic Solution 8-7 | (1i) | 1.0 | FS | 1.0 | 80.9 |
| Example 16-8 | Nonaqueous Electrolytic Solution 8-8 | (2d) | 1.0 | FS | 1.0 | 78.5 |

TABLE 16-continued

| | Nonaqueous electrolytic solution | Component (I) or comparative compound Type | Adding amount [% by mass] | Another additive Type | Adding amount [% by mass] | Initial resistance (relative value) |
|---|---|---|---|---|---|---|
| Example 16-9 | Nonaqueous Electrolytic Solution 8-9 | (2l) | 1.0 | FS | 1.0 | 78.5 |
| Example 16-10 | Nonaqueous Electrolytic Solution 8-10 | (2p) | 1.0 | FS | 1.0 | 79.5 |
| Comparative Example 16-1 | Comparative Nonaqueous Electrolytic Solution 8-1 | — | — | FS | 1.0 | 100 |
| Comparative Example 16-2 | Comparative Nonaqueous Electrolytic Solution 8-2 | MP | 1.0 | FS | 1.0 | 104.0 |
| Comparative Example 16-3 | Comparative Nonaqueous Electrolytic Solution 8-3 | DMI | 1.0 | FS | 1.0 | 102.1 |

As is clear from Tables 1 to 16, it is found that a nonaqueous electrolytic solution battery using a nonaqueous electrolytic solution including Component (I) of the present disclosure has low initial resistance and thus is excellent.

INDUSTRIAL APPLICABILITY

According to the present disclosure, a nonaqueous electrolytic solution and a nonaqueous electrolytic solution battery which can reduce an initial resistance value can be provided. A compound that can be suitably used in the above nonaqueous electrolytic solution can be provided.

Although the present disclosure has been described in detail and with reference to specific examples, it will be apparent to those skilled in the art that various changes and modifications can be made without departing from the spirit and scope of the present disclosure.

The present application is based on a Japanese Patent Application No. 2021-016941 filed on Feb. 4, 2021, the contents of which are incorporated herein by reference.

The invention claimed is:

1. A nonaqueous electrolytic solution, comprising:

(I) at least one selected from the group consisting of a compound represented by the following General Formula (1) and a compound represented by the following General Formula (2);

(II) a solute; and (III) a nonaqueous organic solvent, (1)

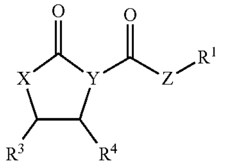

wherein in the General Formula (1), X represents $CH_2$, NH, O, S, or $SO_2$, Y represents CH or N, Z represents $CH_2$, O, or $NR^5$, $R^5$ represents a hydrogen atom, an alkali metal cation, a linear alkyl group having 1 to 12 carbon atoms, or a branched alkyl group having 3 to 12 carbon atoms, an oxygen atom may be included between a carbon atom-carbon atom bond in the alkyl group, any hydrogen atom of the alkyl group may be substituted with a fluorine atom, and when $R^5$ represents an alkali metal cation, a bond between a nitrogen atom and $R^5$ in Z represents an ionic bond, $R^1$ represents $PO(R_f)_2$ or $SO_2R_f$, $R_f$ represents a halogen atom, a linear alkyl group having 1 to 12 carbon atoms, or a branched alkyl group having 3 to 12 carbon atoms, an oxygen atom may be included between a carbon atom-carbon atom bond in the alkyl group, any hydrogen atom of the alkyl group may be substituted with a fluorine atom, and when a plurality of $R_f$'s are present, the plurality of $R_f$'s may be the same or different, and $R^3$ and $R^4$ are independent of each other and each represent a hydrogen atom, a linear alkyl group having 1 to 12 carbon atoms, or a branched alkyl group having 3 to 12 carbon atoms, an oxygen atom may be included between a carbon atom-carbon atom bond in the alkyl group, and any hydrogen atom of the alkyl group may be substituted with a fluorine atom, and (2)

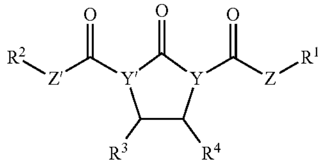

in the General Formula (2), Y and Y' are independent of each other and each represent CH or N, Z and Z' are independent of each other and each represent $CH_2$, O, or $NR^5$, $R^5$ represents a hydrogen atom, an alkali metal cation, a linear alkyl group having 1 to 12 carbon atoms, or a branched alkyl group having 3 to 12 carbon atoms, an oxygen atom may be included between a carbon atom-carbon atom bond in the alkyl group, any hydrogen atom of the alkyl group may be substituted with a fluorine atom, and when $R^5$ represents an alkali metal cation, bonds between nitrogen atoms and $R^5$'s in Z and Z' represent ionic bonds, $R^1$ and $R^2$ are independent of each other and each represent $PO(R_f)_2$ or $SO_2R_f$, $R_f$ represents a halogen atom, a linear alkyl group having 1 to 12 carbon atoms, or a branched alkyl group having 3 to 12 carbon atoms, an oxygen atom may be included between a carbon atom-carbon atom bond in the alkyl group, any hydrogen atom of the alkyl group may be substituted with a fluorine atom, and when a plurality of $R_f$'s are present, the plurality of $R_f$'s may be the same or different, and $R^3$ and $R^4$ are independent of each other and each represent a hydrogen atom, a linear alkyl group having 1 to 12 carbon atoms, or a branched alkyl group having 3 to 12 carbon atoms, an oxygen atom may be included between a carbon atom-carbon atom bond in the alkyl group, and any hydrogen atom of the alkyl group may be substituted with a fluorine atom.

2. The nonaqueous electrolytic solution according to claim 1, wherein $R^1$ in the General Formula (1) represents $POF_2$ or $SO_2F$.

3. The nonaqueous electrolytic solution according to claim 1, wherein $R^1$ and $R^2$ in the General Formula (2) are independent of each other and each represent $POF_2$ or $SO_2F$.

4. The nonaqueous electrolytic solution according to claim 1, wherein

Z in the General Formula (1) represents $NR^5$, $R^5$ represents a hydrogen atom, a lithium ion, a sodium ion, a linear alkyl group having 1 to 4 carbon atoms, or a branched alkyl group having 3 to 4 carbon atoms.

5. The nonaqueous electrolytic solution according to claim 1, wherein

Z and Z' in the General Formula (2) are independent of each other and each represent $NR^5$, $R^5$'s are independent of each other and each represent a hydrogen atom, a lithium ion, a sodium ion, a linear alkyl group having 1 to 4 carbon atoms, or a branched alkyl group having 3 to 4 carbon atoms.

6. The nonaqueous electrolytic solution according to claim 1, wherein the solute is at least one selected from the group consisting of $LiPF_6$, $LiBF_4$, $LiSbF_6$, $LiAsF_6$, $LiClO_4$, $LiCF_3SO_3$, $LiC_4F_9SO_3$, $LiN(SO_2F)_2$, $LiAlO_2$, $LiAlCl_4$, LiCl, and LiI, or at least one selected from the group consisting of $NaPF_6$, $NaBF_4$, $NaSbF_6$, $NaAsF_6$, $NaClO_4$, $NaCF_3SO_3$, $NaC_4F_9SO_3$, $NaN(SO_2F)_2$, $NaAlO_2$, $NaAlCl_4$, NaCl, and NaI.

7. The nonaqueous electrolytic solution according to claim 1, wherein the nonaqueous organic solvent is at least one selected from the group consisting of a cyclic ester, a chain ester, a cyclic ether, a chain ether, a sulfone compound, a sulfoxide compound, and an ionic liquid.

8. The nonaqueous electrolytic solution according to claim 7, wherein the nonaqueous organic solvent contains a cyclic ester, and the cyclic ester is a cyclic carbonate.

9. The nonaqueous electrolytic solution according to claim 8, wherein the cyclic carbonate is at least one selected from the group consisting of ethylene carbonate, propylene carbonate, and fluoroethylene carbonate.

10. The nonaqueous electrolytic solution according to claim 7, wherein the nonaqueous organic solvent contains a chain ester, and the chain ester is a chain carbonate.

11. The nonaqueous electrolytic solution according to claim 10, wherein the chain carbonate is at least one selected from the group consisting of ethyl methyl carbonate, dimethyl carbonate, diethyl carbonate, and methyl propyl carbonate.

12. The nonaqueous electrolytic solution according to claim 1, wherein a content of the (I) is 0.01% by mass to 10.0% by mass with respect to a total amount of the (I), the (II), and the (III).

13. The nonaqueous electrolytic solution according to claim 1, further comprising:

at least one selected from the group consisting of vinylene carbonate, bis(oxalato)borate salt, difluorooxalatoborate salt, difluorobis(oxalato)phosphate salt, tetrafluorooxalatophosphate salt, (difluorophosphoryl)(fluorosulfonyl)imide salt, difluorophosphate salt, fluorosulfonate salt, 1,3-propenesultone, 1,3-propanesultone, 1,6-diisocyanatohexane, ethynylethylene carbonate, 1,3,2-dioxathiolane-2,2-dioxide, 4-propyl-1,3,2-dioxathiolane-2,2-dioxide, methylene methanedisulfonate, 1,2-ethanedisulfonic anhydride, methanesulfonyl fluoride, tris(trimethylsilyl)borate, (ethoxy)pentafluorocyclotriphosphazene, lithium tetrafluoro(malonato)phosphate, tetrafluoro(picolinato) phosphate, 1,3-dimethyl-1,3-divinyl-1,3-di(1,1,1,3,3,3-hexafluoroisopropyl)disiloxane, t-butylbenzene, t-amylbenzene, fluorobenzene, and cyclohexylbenzene.

14. A nonaqueous electrolytic solution battery, at least comprising:

a positive electrode;

a negative electrode;

a separator; and the nonaqueous electrolytic solution according to claim 1.

* * * * *